United States Patent
Ishida et al.

(10) Patent No.: US 8,792,444 B2
(45) Date of Patent: Jul. 29, 2014

(54) DISTRIBUTED ANTENNA SYSTEM, ALLOCATION OF DISTRIBUTED ANTENNAS, BASE STATION

(75) Inventors: Hitoshi Ishida, Fujisawa (JP); Kenzaburo Fujishima, Yokohama (JP); Yunjian Jia, Yokohama (JP)

(73) Assignee: HItachi, Ltd., Tokyo (JP)

( * ) Notice: Subject to any disclaimer, the term of this patent is extended or adjusted under 35 U.S.C. 154(b) by 134 days.

(21) Appl. No.: 13/488,918

(22) Filed: Jun. 5, 2012

(65) Prior Publication Data

US 2012/0314665 A1    Dec. 13, 2012

(30) Foreign Application Priority Data

Jun. 9, 2011    (JP) .................................. 2011-129352

(51) Int. Cl.
  *H04W 4/00*    (2009.01)
(52) U.S. Cl.
  USPC ...................... 370/329; 455/562.1; 455/575.5
(58) Field of Classification Search
  USPC ......... 370/328–329, 330, 332, 334–336, 339, 370/341–343, 345–346, 348, 436–437, 370/441–443, 465; 455/107, 562.1, 575.7
  See application file for complete search history.

(56) References Cited

U.S. PATENT DOCUMENTS

| | | | |
|---|---|---|---|
| 6,058,317 A | 5/2000 | Posti | |
| 6,584,302 B1 * | 6/2003 | Hottinen et al. | 455/69 |
| 6,597,678 B1 * | 7/2003 | Kuwahara et al. | 370/342 |
| 6,804,216 B1 * | 10/2004 | Kuwahara et al. | 370/335 |
| 6,961,362 B2 * | 11/2005 | Ariyoshi et al. | 375/130 |
| 6,982,968 B1 * | 1/2006 | Barratt et al. | 370/328 |
| 7,062,294 B1 * | 6/2006 | Rogard et al. | 455/562.1 |
| 8,537,911 B2 * | 9/2013 | Sayana et al. | 375/260 |
| 2004/0023693 A1 * | 2/2004 | Okawa et al. | 455/562.1 |
| 2004/0037263 A1 * | 2/2004 | Zeira | 370/347 |
| 2005/0181831 A1 * | 8/2005 | Doi | 455/562.1 |
| 2009/0201902 A1 * | 8/2009 | Miki et al. | 370/342 |
| 2009/0239479 A1 * | 9/2009 | Doi | 455/69 |
| 2010/0027479 A1 * | 2/2010 | Sampath et al. | 370/329 |
| 2010/0061317 A1 * | 3/2010 | Gorokhov et al. | 370/329 |
| 2010/0290413 A1 | 11/2010 | Kuwahara | |
| 2011/0085448 A1 * | 4/2011 | Kuwahara | 370/242 |
| 2011/0142025 A1 * | 6/2011 | Agee et al. | 370/342 |
| 2012/0140658 A1 * | 6/2012 | Kanzaki et al. | 370/252 |

FOREIGN PATENT DOCUMENTS

| | | |
|---|---|---|
| JP | 11-501172 A | 1/1999 |
| JP | 2010-268192 A | 11/2010 |

OTHER PUBLICATIONS

"3rd Generation Partnership Project; Technical Specification Group Radio Access Network; Evolved Universal Terrestrial Radio Access (E-UTRA) and Evolved Universal Terrestrial Radio Access Network (E-UTRAN); Overall Description; Stage 2 (Release 10)", 3GPP TS 36.300, vol. 10, No. 2.0, 2010, (three (3) pages).

* cited by examiner

*Primary Examiner* — Kevin Mew
(74) *Attorney, Agent, or Firm* — Crowell & Moring LLP

(57) ABSTRACT

In the case where a base station other than of a distributed antenna system provides a time or frequency at which a transmitted power is low, an antenna group configuration unit estimates a communication area of a mobile station using an uplink reference signal that the mobile station transmits, calculates an inter-system interference power for the communication area of each mobile station based on a received power of the out-of-system base station that the each mobile station reports, calculates the inter-system interference power to each of antennas by averaging the inter-system interference powers that the multiple mobile stations report, and decides antennas that form an antenna group according to magnitudes of the calculated inter-system interference powers.

15 Claims, 21 Drawing Sheets

FIG. 9

| MOBILE STATION ID | ANTENNA ID | INTER-SYSTEM INTERFERENCE POWER (dBm) |
|---|---|---|
| 5-1 | 2-3 | −75 |
| 5-2 | 2-3 | −80 |
| 5-3 | 2-5 | −75 |
| 5-4 | 2-6 | −70 |
| ... | ... | ... |

FIG. 10

| ANTENNA ID | INTER-SYSTEM INTERFERENCE POWER (dBm) |
|---|---|
| 2-1 | −85 |
| 2-2 | −90 |
| 2-3 | −75 |
| 2-4 | −80 |
| ... | ... |

FIG. 13

| ANTENNA GROUP ID (BBU ID) | ANTENNA PORT ID | ANTENNA ID |
|---|---|---|
| 1 | 1 | 2-1 |
| | 2 | 2-2 |
| | 3 | 2-3 |
| | 4 | 2-4 |
| 2 | 1 | 2-5 |
| | 2 | 2-6 |
| | 3 | 2-7 |
| | 4 | 2-8 |
| 3 | 1 | 2-9 |
| | 2 | 2-10 |
| | 3 | 2-11 |
| | 4 | 2-12 |

FIG. 16

ESTIMATED RECEIVED SIGNAL POWER FROM ANTENNA 2-2
IN THE AREA OF ANTENNA 2-3 (dBm)

| MOBILE STATION ID | ANTENNA ID | TRANSMIT ANTENNA ID | | | | | | |
|---|---|---|---|---|---|---|---|---|
| | | 2-1 | 2-2 | 2-3 | 2-4 | 2-5 | 2-6 | ... |
| 5-1 | 2-3 | −75 | −85 | −50 | −65 | −75 | −85 | ... |
| 5-2 | 2-3 | −78 | −80 | −55 | −60 | −78 | −80 | ... |
| 5-3 | 2-5 | −90 | −95 | −78 | −82 | −53 | −62 | ... |
| 5-4 | 2-6 | −95 | −90 | −82 | −78 | −62 | −53 | ... |
| ... | ... | ... | ... | ... | ... | ... | ... | ... |

FIG. 17

ANTENNA RECEIVED SIGNAL POWER FROM ANTENNA 2-2
IN THE AREA OF ANTENNA 2-1 (dBm)

| ANTENNA ID | TRANSMIT ANTENNA ID | | | |
|---|---|---|---|---|
| | 2-1 | 2-2 | 2-3 | ... |
| 2-1 | −50 | −65 | −75 | ... |
| 2-2 | −65 | −50 | −80 | ... |
| 2-3 | −75 | −65 | −50 | ... |
| ... | ... | ... | ... | ... |

FIG. 23

| ANTENNA GROUP ID (BBU ID) | ANTENNA PORT ID | ANTENNA ID |
|---|---|---|
| 1 | 1 | 2-1 |
| | 2 | 2-2 |
| | 3 | 2-7 |
| | 4 | 2-8 |
| 2 | 1 | 2-3 |
| | 2 | 2-4 |
| | 3 | 2-5 |
| | 4 | 2-6 |
| 3 | 1 | 2-9 |
| | 2 | 2-10 |
| | 3 | 2-11 |
| | 4 | 2-12 |

FIG. 24

| MOBILE STATION ID | ANTENNA ID | INTER-SYSTEM INTERFERENCE POWER (dBm) | |
| --- | --- | --- | --- |
| | | FROM OUT-OF-SYSTEM BASE STATIONS APPLYING ABS | FROM OUT-OF-SYSTEM BASE STATIONS NOT APPLYING ABS |
| 5-1 | 2-3 | −75 | −90 |
| 5-2 | 2-3 | −80 | −95 |
| 5-3 | 2-5 | −75 | −100 |
| 5-4 | 2-6 | −70 | −100 |
| ... | ... | ... | ... |

FIG. 25

| ANTENNA ID | INTER-SYSTEM INTERFERENCE POWER (dBm) | |
| --- | --- | --- |
| | FROM OUT-OF-SYSTEM BASE STATIONS APPLYING ABS | FROM OUT-OF-SYSTEM BASE STATIONS NOT APPLYING ABS |
| 2-1 | −85 | −90 |
| 2-2 | −90 | −100 |
| 2-3 | −75 | −95 |
| 2-4 | −80 | −95 |
| ... | ... | ... |

DISTRIBUTED ANTENNA SYSTEM, ALLOCATION OF DISTRIBUTED ANTENNAS, BASE STATION

CLAIM OF PRIORITY

The present application claims priority from Japanese patent application JP 2011-129352 filed on Jun. 9, 2011, the content of which is hereby incorporated by reference into this application.

FIELD OF THE INVENTION

The present invention relates to a distributed antenna system, a distributed antenna allocation method, and a base station, and more specifically, to a distributed antenna system that forms an antenna group according to magnitudes of interference of an other base station other than of the distributed antenna system, a distributed antenna allocation method, and a base station in the distributed antenna system that arranges antennas in a distributed manner.

BACKGROUND OF THE INVENTION

In cellular systems, further improvement in communication speeds is required, and a radio communication system in conformity to an LTE (Long Term Evolution) standard whose maximum transmission speed exceeds 100 Mbps is being put in practical use. LTE intends to improve multipass tolerance, for example, by using OFDMA (Orthogonal Frequency Division Multiple Access) for downlink access and by using SC-FDMA (Single Carrier-Frequency Division Multiple Access) for uplink access, and to improve a spectrum efficiency by introducing MIMO (Multiple-Input Multiple-Output) transmission that uses multiple antennas in a transceiver and a receiver.

The cellular system covers a wide range of area, as a whole of the cellular system, by arranging a high number of base stations each covering a communication area of, for example, about a few hundred meters in a service area. The communication area that the base station covers is called a cell. However, there is a case where there exists an environment to which an electric wave from an outdoor base station called a macro base station is hard to reach, mainly in indoor environments such as high story floors in a building and in the underground. As a technology of securing the communication area in indoor environments like this, the distributed antenna system (DAS: Distributed antenna system) is known.

As conventional technologies, the distributed antenna systems are described in Japanese Unexamined Patent Application (Translation of PCT Application) No. H11 (1999)-501172 and Japanese Unexamined Patent Application Publication No. 2010-268192. Moreover, 3GPP, "Evolved Universal Terrestrial Radio Access (E-UTRA) and Evolved Universal Terrestrial Radio Access Network (E-UTRAN); Overall description; Stage 2," TS36.300, V10.2.0, 2010/12, pp. 119-120 discloses a technology of reducing interferences from other base stations in LTE-Advanced that is a development standard of the LTE.

SUMMARY

FIG. 1 shows an example of a distributed antenna system. In a distributed antenna system 1, a high number of antennas 2-1 to 2-12 are arranged in an indoor environment in a distributed manner, and a base station 3 and the antennas 2-1 to 2-12 are connected by a wire circuit 4, such as optical fiber. By distributed arrangement of the antennas 2-1 to 2-12, the distributed antenna system can shorten distances between the antennas 2-1 to 2-12 and mobile stations 5-1 to 5-8, and can alleviate radio attenuation. As a result, communication areas on high story floors of a building, such as in the surroundings of the antennas 2-1 and 2-2 and in underground, such as in the surroundings of the antennas 2-11 and 2-12 can be secured.

The mobile stations 5-1 to 5-8 belong to any one of antenna groups 1 to 3 each including a single or multiple antennas, and communicate with the base station 3. The base station 3 has a single or multiple baseband units (BBUs: Base Band Units). One BBU corresponds to one of the antenna groups 1 to 3, and performs a signal processing of a signal transmitted and received between itself and the mobile stations 5-1 to 5-8 that belong to each antenna group. Specifically, each of the antenna groups 1 to 3 corresponds to a cell having one cell ID, or a unit that allocates a time or frequency resource to the mobile station (scheduling group).

The different antenna groups 1 to 3 transmit data addressed to different mobile stations 5-1 to 5-8. That is, between the different antenna groups 1 to 3, the signals transmitted mutually become interferences. In the conventional distributed antenna system, in consideration of such interferences by the antennas 2-1 to 2-12 of the distributed antenna system, all the antennas 2-1 to 2-12 of the distributed antenna system were made to form a single antenna group. Alternatively, as disclosed by Japanese Unexamined Patent Application (Translation of PCT Application) No. H11 (1999)-501172 and Japanese Unexamined Patent Application Publication No. 2010-268192, multiple antenna groups were formed so that adjacent antennas may form the same antenna group.

However, in the distributed antenna system 1, the transmitted power of any one of the antennas 2-1 to 2-12 is low compared with that of an other base station of a macro base station 6, etc. located outdoors as shown in FIG. 1 or in other places. Therefore, in an area near a glass window with a low transmission loss etc., a high interference is received from the other base station such as the macro base station 6. Furthermore, there is a possibility that the interference received from the other base station such as the macro base station 6 becomes higher than the interference by the antennas 2-1 to 2-12 of the distributed antenna system depending on a quality of the material of a wall and a floor of a building and directivity of a vertical plane (i.e., a tilt angle) of the antenna installed indoors. As a result, there is a case where a communication quality of the distributed antenna system 1 may deteriorate because of the interference from the other base station such as the macro base station 6.

In the LTE-Advanced that is a development standard of the LTE, a method of providing a time at which the macro base station 6 performs no data transmission (or data transmission with reduced power) to the mobile station is specified as a technology of reducing the interference from the other base station such as the macro base station 6. In the time concerned, the macro base station 6 transmits only a reference signal (also called a pilot signal), a synchronizing signal, and control information with high importance, and does not transmit a data signal. The time is called ABS (Almost Blanc Subframe). The ABS also includes an MBSFN (Multimedia Broadcast multicast service Single Frequency Network) Subframe that does not transmit multicast data among MBSFN Subframes that are times for transmitting the multicast data. This method is disclosed by 3GPP, "Evolved Universal Terrestrial Radio Access (E-UTRA) and Evolved Universal Terrestrial Radio Access Network (E-UTRAN); Overall description; Stage 2," TS36.300, V10.2.0, 2010/12, pp. 119-120, for example.

FIG. 2 is a diagram showing an example of reduction of interference by an other base station other than of the distributed antenna system by the ABS.

The method using the ABS assumes as a target a heterogeneous network such that a base station 8 whose transmitted power is low like a pico base station and a femto base station, that is, whose communication area is narrow exists in a range of the communication area (macro cell) of the macro base station 6, as shown in FIG. 2. The communication area of the pico base station 8 is called a pico cell 9. In the ABS, an interference power to a mobile station 10 connected to the pico base station 8 from the other base station such as the macro base station 6 decreases. The pico base station 8 acquires information of a time when the macro base station 6 becomes in the ABS from the macro base station 6. Then, the pico base station 8 can improve the communication quality of the mobile station 10 connected to the pico base station 8 by allocating a time resource when the macro base station 6 becomes in the ABS to the mobile station 10.

Moreover, FFR (Fractional Frequency Reuse) is known as an other method of reducing the interference between the base stations. In the FFR, a frequency band is divided into multiple frequency groups, and a transmitted power is changed for every frequency group. Referring to FIG. 2, since at a frequency at which the transmitted power of the macro base station 6 is low (or equal to zero), the interference power from the other base station such as the macro base station 6 becomes low, the pico base station 8 can reduce the interference from other base stations such as the macro base station 6, like the above-mentioned ABS, by allocating the frequency to the mobile station 10.

FIG. 3 is a diagram showing an example of an antenna group configuration in the distributed antenna system. FIG. 4 is a diagram showing an example of the interference power by the other base station other than of the distributed antenna system.

For example, as shown in FIG. 3, when applying the distributed antenna system to a high-rise building etc., the interference powers from the other base station such as the macro base station 6 differ for every communication area of each of the antennas 2-1 to 2-12. Such an interference power varies depending on a distance with the macro base station 6, an antenna height of the macro base station 6, a down tilt angle of the antenna, etc. FIG. 4 is an example showing a variation of the interference power from the macro base station 6 as a function of height when the distance from the macro base station is set to 100 m, the antenna height of the macro base station is set to 50 m, and the down tilt angle is set to 15° in FIG. 3. This interference power is a value normalized so that its maximum may become 0 dB. When the interference power from the macro base station 6 becomes as shown in FIG. 4, the communication areas of the antennas 2-5 to 2-8 become areas in each of which an interference power from the macro base station 6 is high in FIG. 3. On the other hand, the communication areas of the antennas 2-1 to 2-4 and the antennas 2-9 to 2-12 become areas in each of which the interference power from the macro base station 6 is low.

Thus, in the distributed antenna system 1, the area in which the interference from the macro base station 6 is high and the area in which it is low are intermingled in the areas that one base station 3 covers. This fact is not limited in the variation of the interference power in a vertical direction as shown in FIG. 4 but is also the same in the variation of the interference power in a horizontal direction. In addition, such interference from the macro base station 6 varies with extension of the macro base station 6 and an environmental variation of a surrounding building etc.

On the other hand, in the case where adjacent antennas are allocated to the same antenna group considering only interferences of the antennas of the distributed antenna system, like the conventional distributed antenna system, there is a possibility that the antennas 2-5 to 2-8 covering an area in which the interference from the macro base station 6 is high are allocated to the same antenna group like an antenna group 2 of FIG. 3. If an interference reduction technology such as the ABS and the FFR is applied to the distributed antenna system that formed the antenna groups as shown in FIG. 3, the mobile stations each of which has a high need to be allocated the time or frequency resource at which the interference power from the macro base station 6 is low are concentrated on one antenna system. For example, in FIG. 3, four mobile stations of mobile stations 5-3 to 5-6 are mobile stations at each of which the interference power from the macro base station 6 is high. In the antenna group 2, since these four mobile stations share the time or frequency resource at which the interference from the macro base station 6 becomes low, the time or frequency resource that is available for each one mobile station decreases. As a result, there is a possibility that communication efficiency of the mobile station may fall.

Moreover, there is a possibility that the interference power from the other base station such as the macro base station may vary due to the extension and removal of the macro base station, the environmental variation of the surrounding building, etc. However, the conventional distributed antenna system has a problem of being incapable of responding to such a variation in interference state because it does not consider the interferences from the other base stations.

In view of the above point, the present invention has an object to improve the communication efficiency of the mobile station that suffers a high interference from other base stations like this in the distributed antenna system by forming the antenna group with consideration given to a relationship between the communication area of each antenna and the interference from the other base station other than the base station of the distributed antenna system.

Moreover, the present invention has an object to re-form the antenna group responding to a variation in a state of interference from other base stations other than the base station of the distributed antenna system.

According to an aspect of the present invention, the problem is solved by the distributed antenna system that includes: BBUs each for performing a baseband signal processing of the antenna group that is formed with a single or multiple antennas; an antenna group configuration unit that includes a plurality of schedulers each for allocating the time or frequency resource to the mobile station in the antenna group, forms multiple antenna groups, and decides the antennas that form each antenna group; and a switch for connecting the BBUs and the antennas according to the decided antenna groups; in which when a base station other than of the distributed antenna system provides a time or frequency at which the transmitted power is low, the antenna group configuration unit estimates the communication area of the mobile station using the uplink reference signal transmitted by the mobile station, calculates the interference powers from an other base station to the communication area of the mobile station based on the received powers of the other base station other than the base station of the distributed antenna system that the mobile stations report, calculates the received powers from the other base station to each antenna by averaging the interference powers from the other base station that the multiple mobile stations report, and decides the antennas that form the antenna group according to magnitudes of the calculated interference powers from the other base station.

According to another aspect of the present invention, there is provided a distributed antenna system, including multiple antennas and a base station for transmitting and receiving the signals with the multiple antennas, forming multiple antenna groups, and deciding a single or multiple antennas that form the each antenna group, in which when the other base station other than the above-mentioned base station included in the distributed antenna system provides a time or frequency at which the transmitted power is reduced among of time or frequency resources, the base station estimates the antennas in the communication area of each mobile station using a received power of the uplink reference signal transmitted by the each mobile station, calculates interference powers from the other base station to the antennas in the communication area of the mobile station based on received powers of the downlink reference signal from the other base station that respective mobile stations report, calculates a first interference power from the other base station to the each antenna by averaging the interference powers from the other base station that the multiple mobile stations report, decentralizes a single or multiple antennas at which the first interference powers are relatively high into different antenna groups according to magnitudes of the calculated first interference powers, and decides the antennas that form the antenna group by combining the antenna (s) with a single or multiple antennas at which the first interference powers are relatively low.

According to still another aspect of the present invention, there is provided a distributed antenna allocation method in the distributed antenna system, the distributed antenna system including multiple antennas and a base station for transmitting or receiving with the multiple antennas, forming multiple antenna groups, and deciding a single or multiple antennas that form the each antenna group, in which when the other base station other than the base station included in the distributed antenna system provides a time or frequency at which the transmitted power is reduced among of time or frequency resources, the base station estimates antennas in the communication area of each mobile station using the received power of the uplink reference signal transmitted from the each mobile station, calculates the interference powers from the other base station to the antennas in the communication area of the mobile station based on received powers of the downlink reference signal from the other base station that respective mobile stations report, calculates a first interference power from the other base station to the each antenna by averaging the interference powers from the other base station that the multiple mobile stations report, and decentralizes a single or multiple antennas at which the first interference powers are relatively high into different antenna groups according to magnitudes of the calculated first interference powers, and decides the antennas that form the antenna group by combining the antenna(s) with a single or multiple antennas at which the first interference powers are relatively low.

According to yet another aspect of the present invention, there is provided a base station in the distributed antenna system, including an antenna group configuration unit for transmitting or receiving signals with multiple antennas, forming multiple antenna groups, and deciding a single or multiple antennas that form the each antenna group, in which when the other base station other than the base station included in the distributed antenna system provides a time or frequency at which the transmitted power is reduced among of time or frequency resources, the antenna group configuration unit estimates the antennas in the communication area of each mobile station using the received powers of the uplink reference signal transmitted by the each mobile station, calculates the interference powers from the other base station to the antennas in the communication area of the mobile station based on the received powers of the downlink reference signal from the other base station that respective mobile stations report, calculates the first interference power from the other base station to the each antenna by averaging the interference powers from the other base station that the multiple mobile stations report, decentralizes a single or multiple antennas at which the first interference powers are relatively high into different antenna groups according to magnitudes of the calculated first interference powers, and decides the antennas that form the antenna group by combining the antenna(s) with a single or multiple antennas at which the first interference powers are relatively low.

According to one aspect of the present invention, by deciding the antennas that form the antenna group according to magnitudes of the interference from the other base station other than the base station of the distributed antenna system, it is possible to divide the antennas that cover the communication areas in each of which the interference from the other base station is high into different antenna groups and thereby to decentralize the mobile stations each having a high need to be allocated the time or frequency resource at which the interference from the other base station like this is low into multiple antenna groups. As a result, the time or frequency resource that the mobile station can use and at which the interference from the other base stations is low improves, which can improve the communication efficiency of the mobile station. Moreover, according to the present invention, by periodically acquiring the interference from the other base station other than the base station of the distributed antenna system and performing re-formation of the antenna group, it is possible to respond to such a variation in a state of the interference from the other base station.

BRIEF DESCRIPTION OF THE DRAWINGS

FIG. 9 is a diagram showing an example of a table showing an antenna covering a communication area of each mobile station and the inter-system interference power;

FIG. 10 is a diagram showing an example of a table showing a relationship between the antenna and the inter-system interference power;

FIG. 13 is a diagram showing an example of a table showing a correspondence between the antenna group and the antennas;

FIG. 16 is a diagram showing an example of a table showing the antenna covering the communication area of each mobile station and a calculated result of a received power from each antenna in the communication area;

FIG. 17 is a diagram showing an example of a table showing a relationship between the antenna and the intra-system interference power;

FIG. 23 is an example of a table showing a correspondence between the antenna group and the antennas after a change;

FIG. 24 is a diagram showing an example of a table showing the antenna covering the communication area of each mobile station, and calculated results of the inter-system interference power from the base stations which apply the ABS and of the inter-system interference power from the base stations which don't apply the ABS; and FIG. 25 is a diagram showing an example of a table showing a relation among the antenna, the inter-system interference power from the base stations which apply the ABS, and the inter-system interference power from the base stations which don't apply the ABS.

DETAILED DESCRIPTION OF THE DRAWINGS

1. System Configuration

In this embodiment, hereafter, an interference that is generated by a signal transmitted or received by multiple antennas connected to a base station of a distributed antenna system is called an intra-system interference for convenience because that is a so-called interference generated in the distributed antenna system. Moreover, hereafter, an interference that is generated by the signal transmitted or received by a single or multiple antennas connected to an other base station other than the base station of the distributed antenna system is called an inter-system interference for convenience because that is a so-called interference coming from outside the distributed antenna system. Incidentally, regarding the inter-system interference, a case where the other base station not connected to the base station of the distributed antenna system is installed inside a region of the distributed antenna system may be included.

Moreover, below, although the other base station other than the base station of the distributed antenna system will be explained taking the macro base station as an example, the present invention and/or this embodiment can be applied to appropriate base stations, such as a femto base station and a pico base station.

Figure 1:
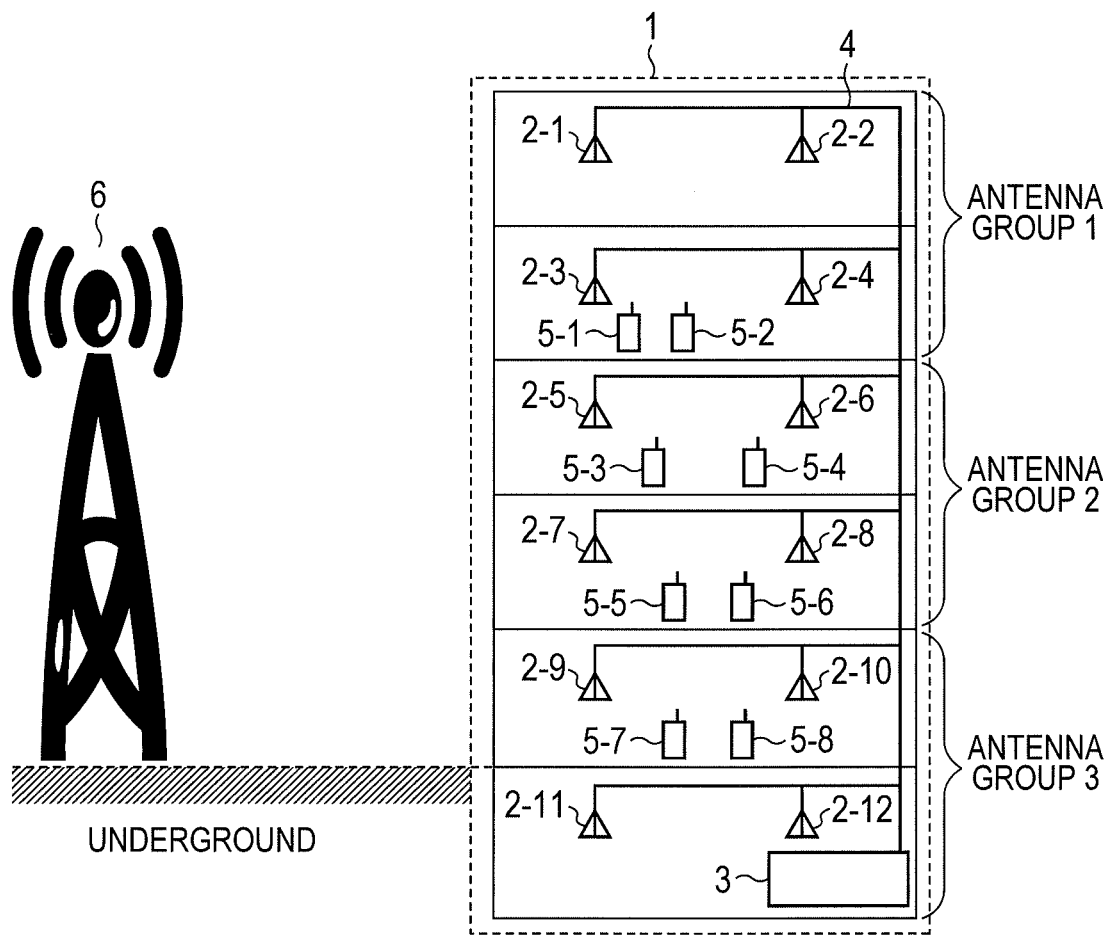
FIG. 1 is a diagram showing an example of a distributed antenna system and an other base station other than of the distributed antenna system.
Figure 2:
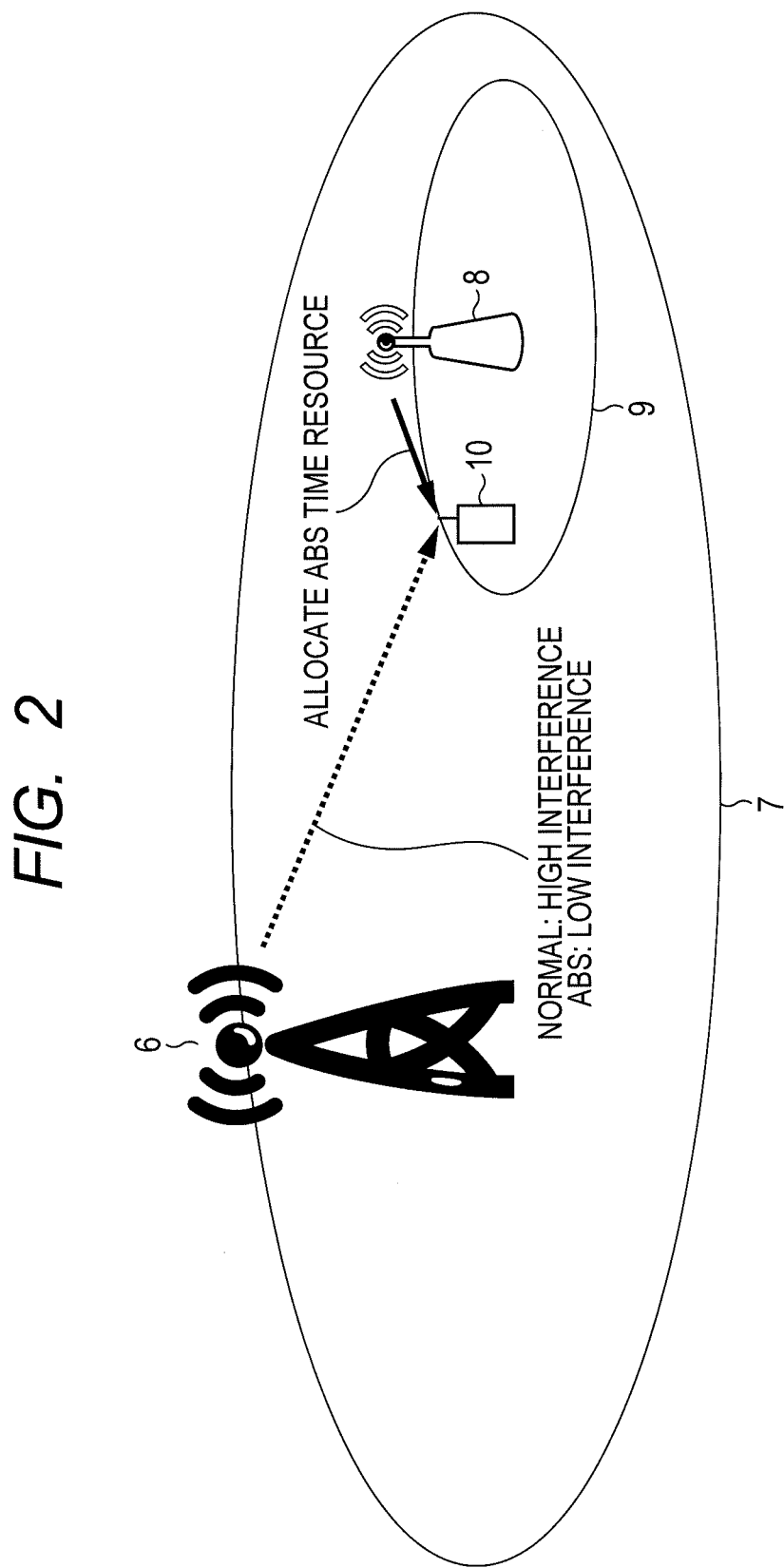
FIG. 2 is a diagram showing an example of reduction of interference by the other base station other than of the distributed antenna system by ABS.
Figure 3:
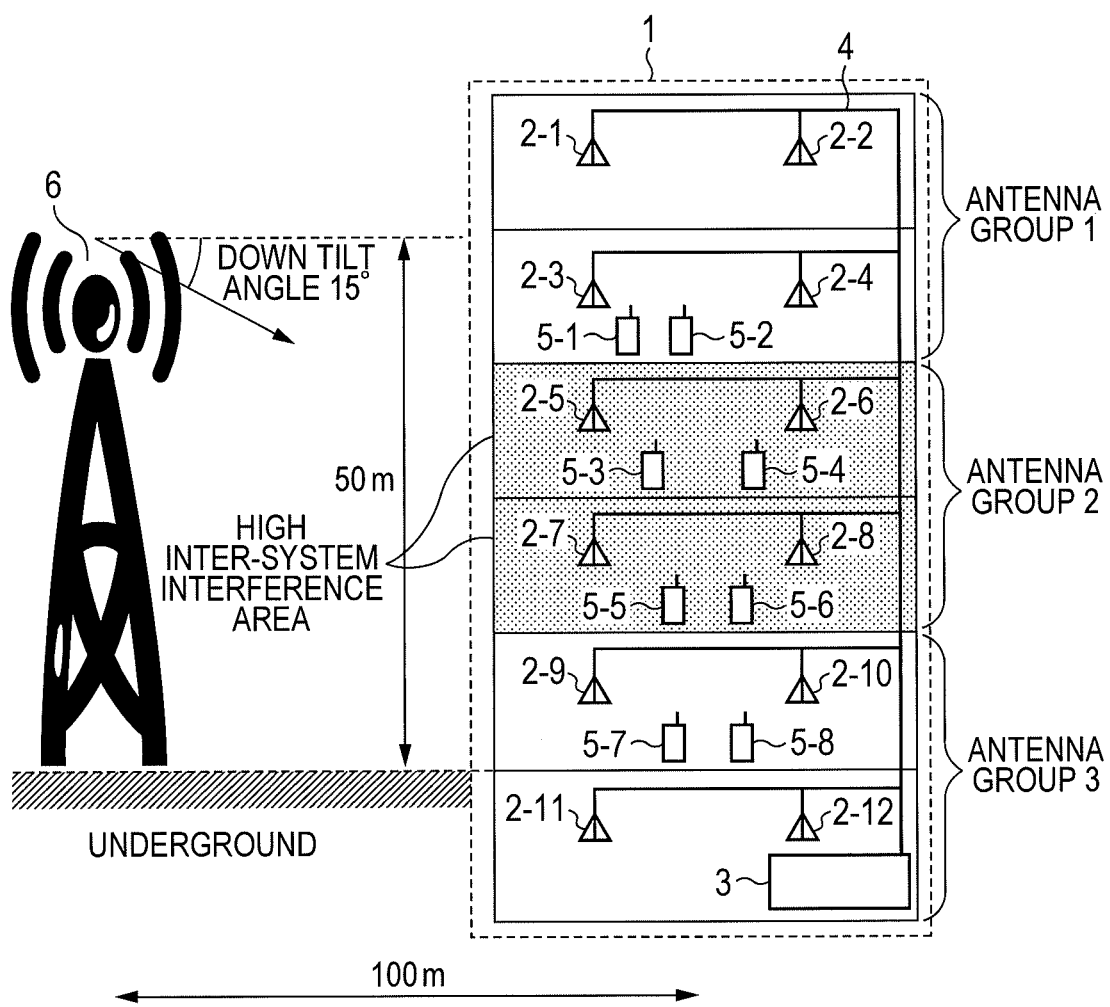
FIG. 3 is a diagram showing an example of an antenna group configuration in the distributed antenna system.

FIG. 3 is an example of a system configuration of a system that this embodiment assumes as a target and an antenna group formed in the distributed antenna system. There exists therein a macro base station 6 that forms an outdoor communication area and a distributed antenna system 1 that forms an indoor communication area. Antennas 2-1 to 2-12 arranged in a distributed manner in the distributed antenna system 1 are connected with a base station 3 through a wire circuit 4, such as optical fiber. The base station 3 has multiple BBUs as will be described later, and one BBU performs a signal processing of the signal transmitted and received using a single or multiple antennas. The base station 3 forms multiple antenna groups 1 to 3 by connecting the BBUs and the antennas 2-1 to 2-12. FIG. 3 shows an example of a case where the antenna groups 1 to 3 are formed independent from an inter-system interference power. Mobile stations 5-1 to 5-8 measure the received powers of the reference signals transmitted from respective antennas 2-1 to 2-12 of the antenna groups 1 to 3, and perform communication with the base station 3 using an antenna group at which a sum of the received powers of the antennas 2-1 to 2-12 that form the antenna groups 1 to 3 becomes a maximum from among the antenna groups 1 to 3. That is, each of the mobile stations 5-1 to 5-8 compares a sum of the received powers of the reference signals of the antennas 2-1 to 2-4 that form an antenna group 1, a sum of the received powers of the reference signals of the antennas 2-5 to 2-8 that form an antenna group 2, and a sum of the received powers of the reference signals of the antennas 2-9 to 2-12 that form an antenna group 3, selects an antenna group in which a sum of the received powers becomes a maximum (or more than or equal to a previously set threshold), and performs the communication with the base station 3, respectively. Specifically, each one of the antenna groups 1 to 3 corresponds to a cell having one cell ID, or a unit (scheduling group) that allocates a time or frequency resource to the mobile station. The base station 3 can perform transmission and reception of the signal with the macro base station 6 through an interface (for example, one called X2 in LTE) between the base stations. Pieces of the information transmitted and received between the base station 3 and the macro base station 6 include information about handover of the mobile station, information about FFR of the macro base station (in the LTE, being called RNTP: Relative Narrowband TX Power indication), information about a time at which the macro base station becomes ABS, etc.

The macro base station 6 performs the communication with an unillustrated mobile station outside the distributed antenna system. Like the ABS or the FFR, the macro base station 6 reduces the inter-system interference to the distributed antenna system 1, other pico base stations not illustrated, etc. by providing a time or frequency at which the data transmission is not performed or the transmitted power is made low. In the following, it is assumed that the macro base station 6 shall use an interference reduction technology in time domain by the ABS, and shall allocate a time resource to the mobile station. However, this invention and/or this embodiment can be realized easily only by replacing time with frequency even in the case of the interference reduction technology in frequency domain such as the FFR and in the case of allocating the frequency resource to the mobile station.

Incidentally, in the case where the base station has multiple cells, a single or multiple cells can also form one antenna group. At this time, for example, there are a case where one BBU corresponds to one cell ID, a case where one antenna group has one cell ID, etc.

Figure 4:
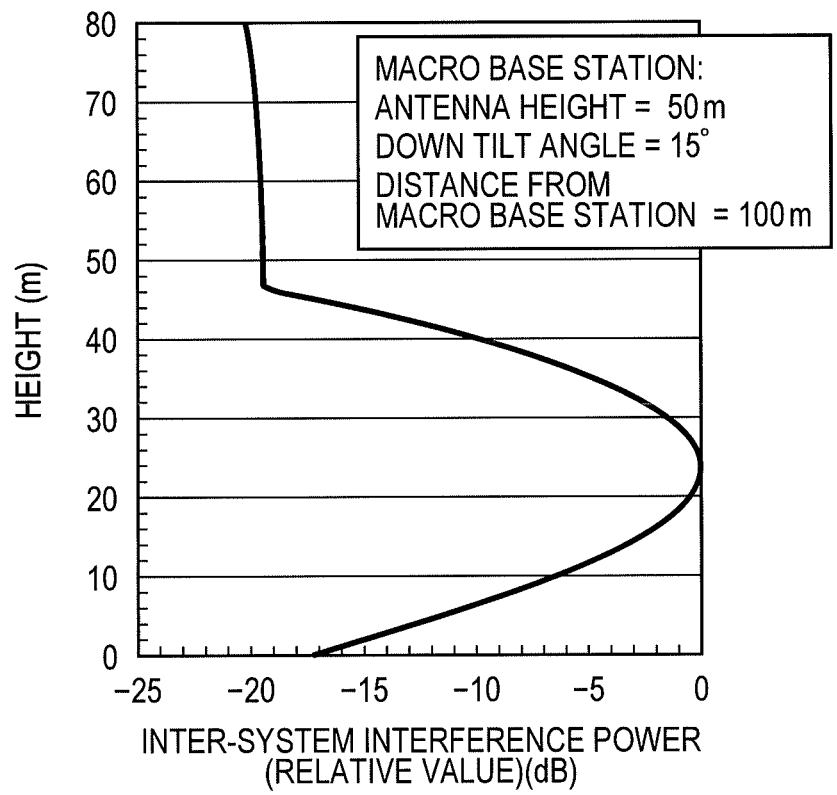
FIG. 4 is a diagram showing an example of an interference power by the other base station other than of the distributed antenna system.
Figure 5:
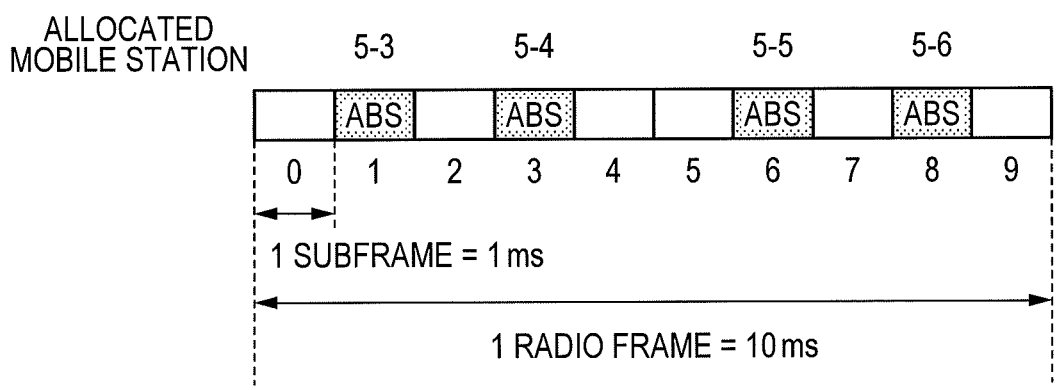
FIG. 5 is a diagram showing an example of an allocation result of a time resource of an antenna group 2 in the distributed antenna system.

FIG. 5 shows an example of time resource allocation in the antenna group 2 of FIG. 3. As an example of a time resource, a time frame configuration of the LTE standard was used. A Subframe is a unit of the time resource to be allocated to the mobile station, and 10 Subframes that are put together is called a single Radio frame. In FIG. 5, the Subframes 1, 3, 6, and 8 are specified to be the ABS of the macro base station 6. As shown in FIG. 3 and FIG. 4, in the communication areas of the antennas 2-5, 2-6, 2-7, and 2-8 that form the antenna group 2, an inter-system interference power from the macro base station 6 is high. Therefore, in FIG. 5, the time resource of the ABS is allocated to the mobile stations 5-3, 5-4, 5-5, and 5-6 located in those communication areas. It is also possible to allocate the time resource other than of the ABS to the mobile stations 5-3 to 5-6. However, in a time other than the ABS, the communication qualities of the mobile stations 5-3 to 5-6 are low, and data communication may become impossible.

As described above, if the antenna groups 1 to 3 are formed without taking into consideration influences of the inter-system interference, the ABS, etc., there will be a possibility that mobile stations having a high need to perform the communication in the ABS may concentrate in one antenna group 2 as shown in FIG. 3. That is, as was shown in FIG. 5, the communication will be performed by dividing the time resource of the ABS among a high number of mobile stations. As a result, the time resource of the ABS that one mobile station can use may decrease, and communication efficiency of a mobile station with a high inter-system interference may fall.

Figure 6:
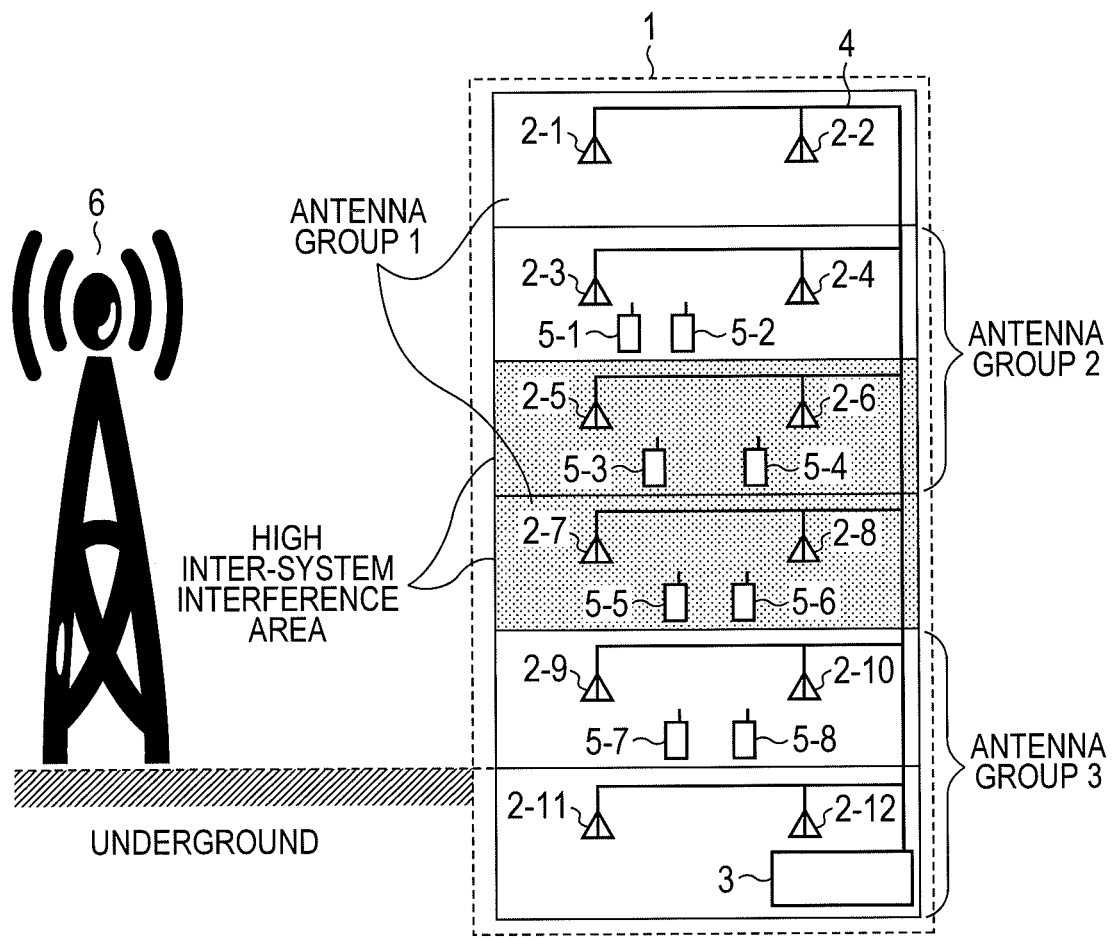
FIG. 6 is a diagram showing an example of the distributed antenna system that forms an antenna group according to a magnitude of an inter-system interference power.

FIG. 6 shows an example of the distributed antenna system that formed the antenna group according to magnitudes of the inter-system interference according to this embodiment. In FIG. 6, the antenna group 1 is formed with the antennas 2-1, 2-2, 2-7, and 2-8, the antenna group 2 is formed with the antennas 2-3, 2-4, 2-5, and 2-6, and the antenna group 3 is formed with the antennas 2-9, 2-10, 2-11, and 2-12. A different point from FIG. 3 is that the antennas 2-5 and 2-6 that cover an area where the inter-system interference is high and the antennas 2-7 and 2-8 that do the same form different antenna groups.

Figure 7:
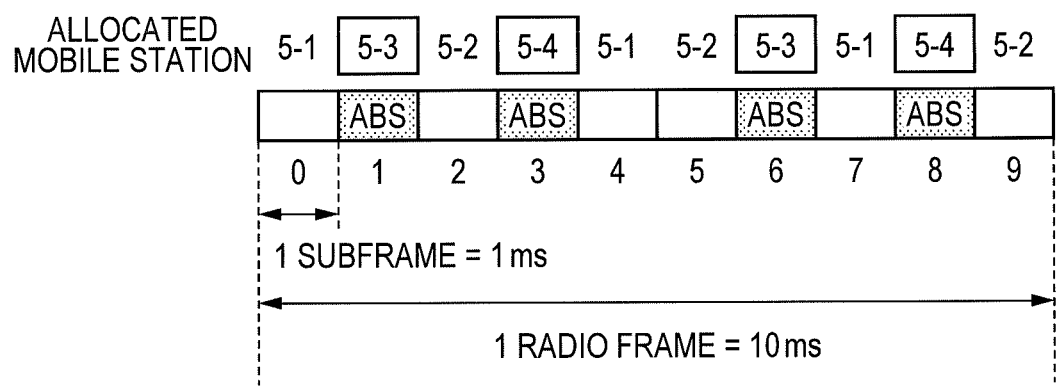
FIG. 7 is a diagram showing an example of an allocation result of the time resource of the antenna group 2 in the distributed antenna system that forms the antenna group according to magnitudes of the inter-system interference power.

FIG. 7 shows an example of allocation of the time resource in the antenna group 2 of FIG. 6. The mobile stations located in the communication area of the antenna group 2 are four mobile stations, the mobile stations 5-1, 5-2, 5-3, and 5-4. Among them, the mobile stations 5-3 and 5-4 are located in the communication area where the inter-system interference is high and the mobile stations 5-3 and 5-4 are located in the communication area where the inter-system interference is low. Therefore, the base station 3 allocates the time resource of the ABS preferentially to the mobile stations 5-3 and 5-4, and allocates the time resource other than of the ABS preferentially to the mobile stations 5-1 and 5-2. Since the mobile stations 5-1 and 5-2 have low inter-system interferences, even if it allocates the time resource other than of the ABS, a communication quality will not fall considerably compared with the case with the ABS. On the other hand, in FIG. 7, the time resource of the ABS that the mobile stations 5-3 and 5-4 each with a high inter-system interference can use is improved to be twice of FIG. 5. Thus, by dividing the antennas that cover an area in which the inter-system interference is high into different antenna groups, the time resource of the ABS that the mobile station with a high inter-system interference can use increases and the communication efficiency of the mobile station can be improved.

Figure 8:
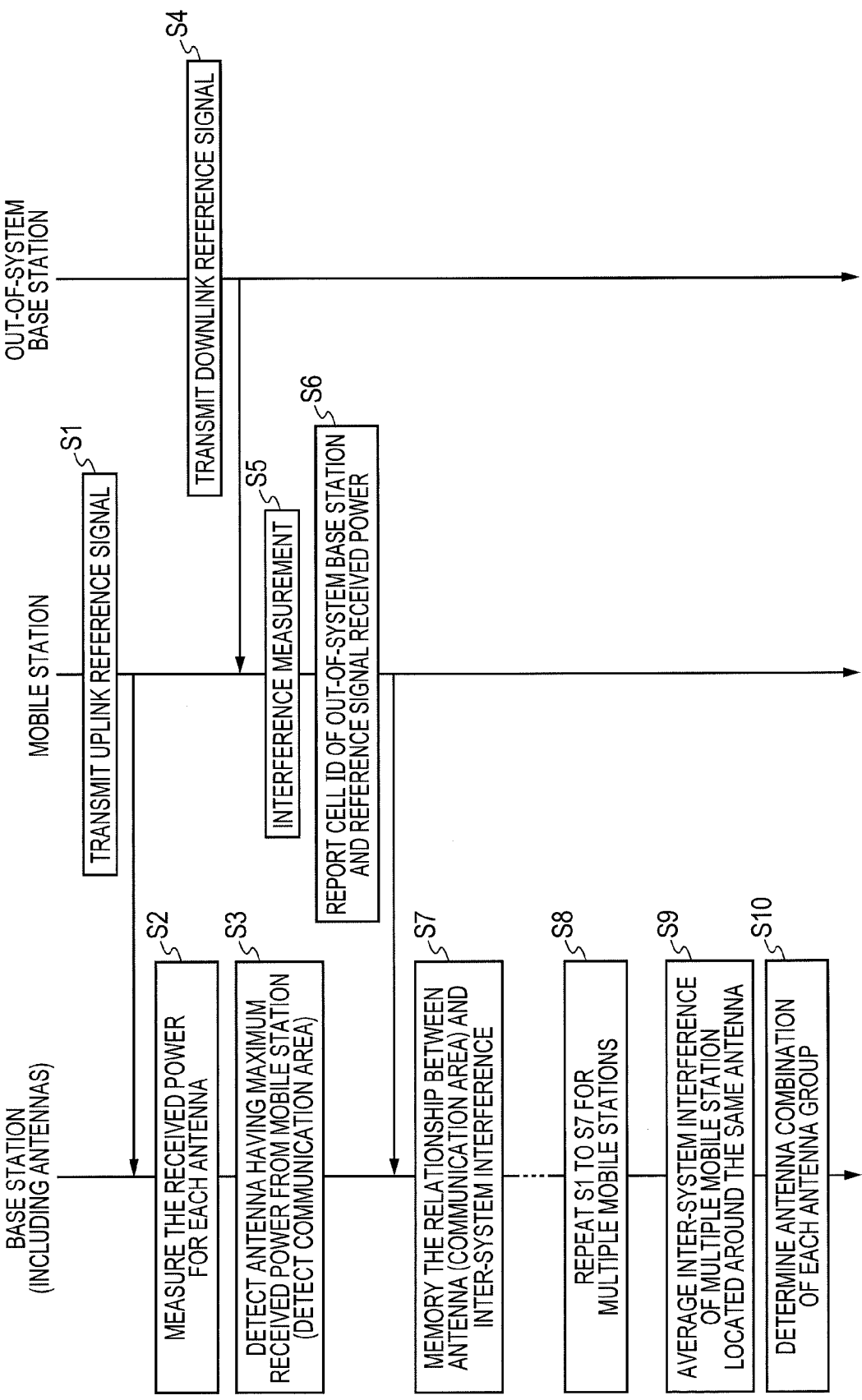
FIG. 8 is a sequence diagram until forming the antenna group according to the magnitudes of the inter-system interference power.

2. Sequence Diagram Until Forming Antenna Group Responding To Inter-System Interference In this embodiment, hereafter, the base station other than the base station of the distributed antenna system is called out-of-system base station for convenience. FIG. 8 is a sequence diagram until forming the antenna group according to magnitudes of the inter-system interference according to this embodiment. In FIG. 8, the base station includes the antennas. In a first state of installation (initial state) of the base station, the antenna group that the base station forms may have whatever kind of combination. The mobile station transmits the uplink reference signal to the base station (S1). The base station measures a received power of the uplink reference signal received by each antenna (S2). Then, it detects the antenna whose received power of the uplink reference signal is a maximum (or more than or equal to the previously set threshold), and presumes the mobile station to be located in the communication area of the antenna (S3). The out-of-system base station is transmitting the downlink reference signal periodically (S4). The mobile station measures the received power of the downlink reference signal of the out-of-system base station (S5), and reports the measured received power and an ID of the out-of-system base station (S6). In FIG. 8, although it is assumed that the out-of-system base station is one, it may be multiple out-of-system base stations or cells that exist in the surroundings of the mobile station, and may exist inside a building, an area, etc. of the distributed antenna system. In Step S6, a report of the ID and the interference power is called Measurement Report in the LTE. In the Measurement Report, when the mobile station satisfies conditions that were specified by the base station, or periodically, the mobile station reports cell IDs of a cell to which itself connects and other cells and the received power (called RSRP: Reference Signal Received Power) of the reference signal of the cell. The base station assumes that the received power of the reference signal of the out-of-system base station reported from the mobile station at Step S6 is the inter-system interference power in the communication area of the antenna that was assumed at Step S3. Then, the base station stores a relationship between the antenna and a magnitude of the inter-system interference power (S7). However, the inter-system interference power to be stored differs according to a formation method of the antenna group that will be described later. In the case of using a formation method of the antenna group shown in FIG. 14, a total sum of the inter-system interference powers of the out-of-system base station to which the ABS is applied is calculated and stored. In the case of using a formation method of the antenna group in FIG. 18, a total sum of the inter-system interference powers of the out-of-system base stations to which the ABS is applied and a total sum of the inter-system interference powers of the out-of-system base stations to which the ABS is not applied are calculated and stored, respectively. When the received powers of the multiple out-of-system base stations are reported, the base station adds the received powers of the multiple out-of-system base stations and designates the sum as the inter-system interference power in the communication area of the antenna. However, the inter-system to be stored at Step S7 may be the one obtained by repeating the operations of Steps S1 to S7 on the same mobile station and taking a time average of the inter-system interference powers. The base station performs operations of Steps S1 to S7 on multiple mobile stations, and acquires a relationship between the antenna (i.e., the communication area of the antenna) and the inter-system interference power for the multiple mobile stations (S8).

FIG. 9 is a diagram showing an example of a table showing an antenna covering the communication area of each mobile station and a calculated result of the inter-system interference power. FIG. 24 is a diagram showing an example of a table showing the antenna covering the communication area of each mobile station, and calculated results of the inter-system interference power from the out-of-system base stations which apply the ABS and of the inter-system interference power from the out-of-system base stations which don't apply the ABS.

The base station stores the inter-system interference power acquired at Steps S7 and S8 in memory, for example, in a form as shown in FIG. 9 (or FIG. 24). Then, it averages the inter-system interference powers of the multiple mobile stations located in the communication area of the same antenna (S9). For example, in FIG. 9 (or FIG. 24), the inter-system interference powers of the mobile stations 5-1 and 5-2 located in the communication area of the same antenna 2-3 are averaged. By repeatedly performing above operations, the base station calculates the inter-system interference power for every antenna in the distributed antenna system. The base station stores the inter-system interference power for each antenna in memory in a form as shown in FIG. 10. Alternatively, it stores the inter-system interference power from the out-of-system base stations which apply the ABS and the inter-system interference power from the out-of-system base stations which don't apply the ABS, respectively, in a form as shown in FIG. 25. Subsequently, the base station decides the antennas that form each antenna group according to magnitudes of the calculated inter-system interference powers (S10).

The base station performs operations of Steps S1 to S9 using one day or a few hours as one period, for example, and calculates a relationship between the antenna and the inter-system interference as long-term statistical information. The decision of the antennas that form the antenna group at Step S10 is performed at a timing of, for example, once in one day or a few hours in conformity with a period in which the relationship between the antenna and the inter-system interference is calculated. For example, what is necessary is to take statistics of the relationship between the antenna and the inter-system interference during a day and to form or re-form the antenna group in a time zone, such as a midnight time zone, when almost no communication mobile station exists. Thus, by taking the statistics of the inter-system inference power periodically and reforming the antenna group based on information that was taken by statistics, it is possible to respond to an environmental variation, such as extension and removal of the out-of-system base station.

3. Apparatus Configuration

Figure 11:
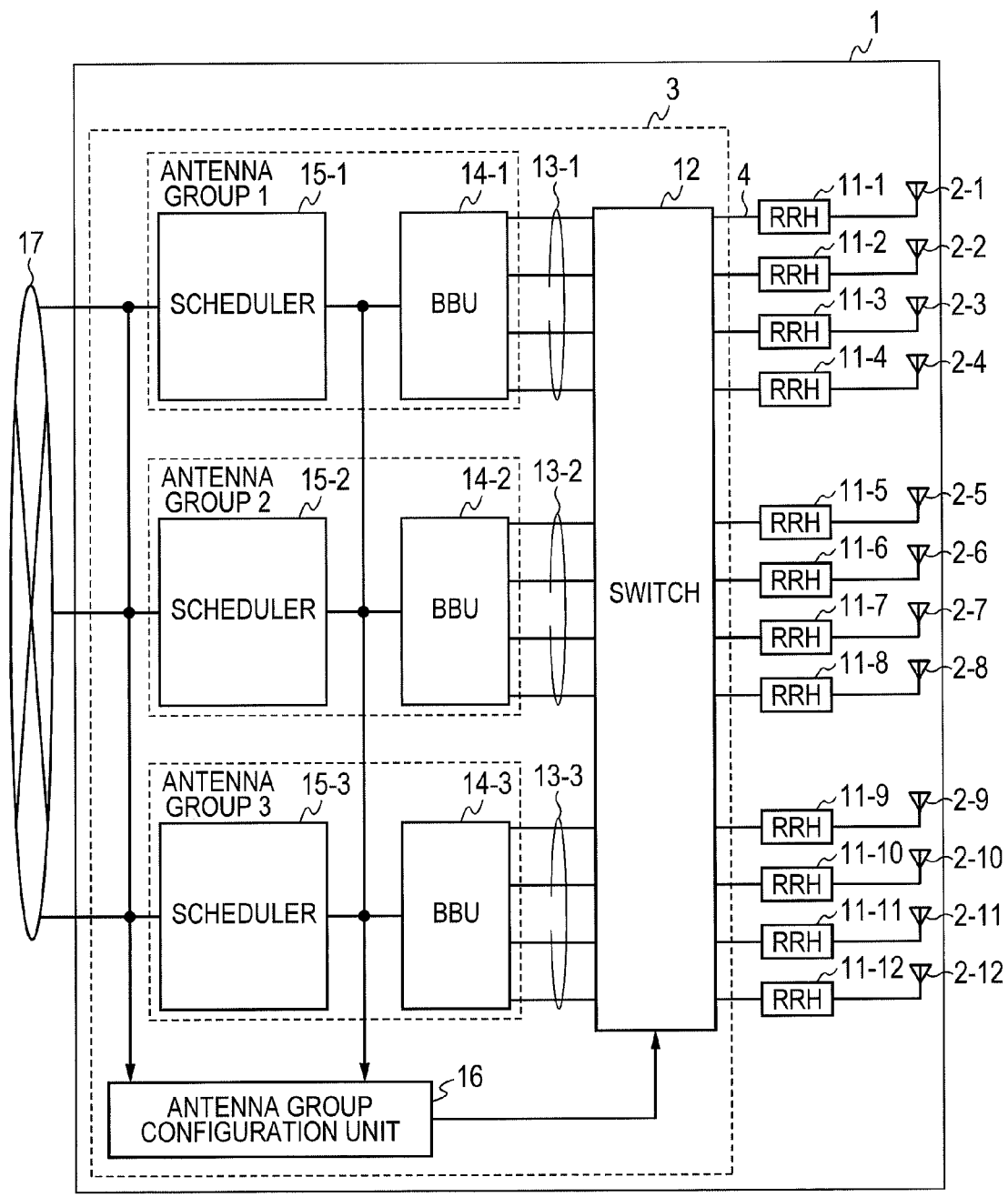
FIG. 11 is a diagram showing an example of an apparatus configuration of the distributed antenna system according to this embodiment.

FIG. 11 is a configuration example of the distributed antenna system 1 and the base station 3. A high number of antennas 2-1 to 2-12 are arranged in a distributed manner in an area that the distributed antenna system assumes as a target. The antennas 2-1 to 2-12 are connected with respective RRHs 11-1 to 11-12 (Remote Radio Heads). Each of the RRHs 11-1 to 11-12 has an interface with the wire circuit 4, and when the wire circuit 4 is optical fiber, has a photoelectric converter for converting an optical signal into an electric signal or converting the electric signal into the optical signal. Furthermore, it has a converter for converting a baseband signal that is a converted electric signal into a radio frequency signal, an amplifier of the radio frequency signal, etc.

The wire circuit 4 is optical fiber etc. and connects between the RRHs 11-1 to 11-12 and a switch 12. The wire circuit 4 makes bidirectional transmission of the baseband signal outputted from the RRHs 11-1 to 11-12 and the switch 12 as the optical signal. Alternatively, the wire circuit 4 may be coaxial cable or other cables, and in that case, makes bidirectional transmission of the radio frequency signal.

The switch 12 connects between antenna port outputs 13-1 to 13-3 of BBUs 14-1 to 14-3 and the RRHs 11-1 to 11-12 (i.e., the antennas 2-1 to 2-12) through the wire circuit 4. Connection information of the antenna port outputs 13-1 to 13-3 and the RRHs 11-1 to 11-12 is inputted from an antenna group configuration unit 16. Moreover, in the case where the wire circuit 4 is optical fiber, the switch 12 has a photoelectric converter for converting the electric signal inputted from one of the antenna port outputs 13-1 to 13-3 into the optical signal and for converting the optical signal inputted from one of the RRHs 11-1 to 11-12 into the electric signal.

The BBUs 14-1 to 14-3 perform the baseband signal processing of the control signal or the data signal based on scheduling results inputted from schedulers 15-1 to 15-3 (a selection result of the mobile station to which the time resource is allocated, a communication method of the mobile station, an allocation result of the frequency resource, etc.). The communication methods include a modulation method, a code rate, a MIMO communication method, etc., and are conformity to the LTE or LTE-Advanced standard, for example. The BBUs 14-1 to 14-3 have the single or multiple antenna port outputs 13-1 to 13-3, respectively. Each one of the BBUs 14-1 to 14-3 performs the signal processing of one of the antenna groups 1 to 3. The baseband signals that were generated in the respective BBUs 14-1 to 14-3 and were outputted from the antenna port outputs 13-1 to 13-3 are transmitted from the antennas 2-1 to 2-12 corresponding to the respective antenna groups 1 to 3 through the switch 12 and the wire circuit 4. A correspondence of the antenna groups 1 to 3 and the antennas 2-1 to 2-12 is decided in the antenna group configuration unit 16. Moreover, the BBUs 14-1 to 14-3 measure the received powers of the reference signals transmitted from the mobile station at the antennas 2-1 to 2-12. The received powers of the antennas 2-1 to 2-12 being measured are notified to the antenna group configuration unit 16. The schedulers 15-1 to 15-3 are, for example, processors of L2 (Layer2) and L3 (Layer3).

The schedulers 15-1 to 15-3 receive the data signals addressed to the mobile stations communicating with the antenna groups 1 to 3 from the gateway through a backhaul 17 and store them in buffers, respectively. Moreover, the schedulers 15-1 to 15-3 generate the control signals addressed to the mobile stations and store them in the buffers, respectively. Then, the schedulers 15-1 to 15-3 decide the mobile station that is allowed to communicate in a certain time based on the communication quality (CQI: Channel Quality Indicator) of each mobile station reported from the each mobile station, a buffer residual quantity of the data signal and the control signal addressed to the each mobile station, information of the ABS or information of the FFR notified from the other base station outside the distributed antenna system, etc. That is, the time resource is allocated to the mobile station. How to allocate the time resource in the case where there is the information of the ABS or the information of the FFR will be described later. The schedulers 15-1 to 15-3 allocate the time resource to the mobile station, and at the same time decide a communication method of the mobile station (the modulation method, the code rate, the MIMO communication method, etc.) and the frequency resource of the mobile station, and notify information of resource allocation and information of the communication method to the BBUs 14-1 to 14-3. In addition, the schedulers 15-1 to 15-3 receive the received powers of the antenna groups 1 to 3 to which respective mobile stations are connected, the received powers of other antenna groups 1 to 3 in the distributed antenna system, and information of the received powers of the out-of-system base stations, and stores them in memory. The schedulers 15-1 to 15-3 compare the received powers of the antenna groups 1 to 3 to which the respective mobile stations connect and that are reported from the mobile stations and the received powers of the other antenna groups 1 to 3 or the out-of-system base station. Then, the schedulers 15-1 to 15-3 perform handover to the other antenna group or handover to the out-of-system base station when there is an antenna group or an out-of-system base station whose received power is higher than that of the antenna group to which the mobile station is currently being connected. Moreover, the schedulers 15-1 to 15-3 notify the received powers to the antenna group configuration unit 16.

The antenna group configuration unit 16 decides correspondences among the antennas 2-1 to 2-12, the BBUs 14-1 to 14-3, and the schedulers 15-1 to 15-3 according to magnitudes of the inter-system interference. That is, it decides combinations of the antennas 2-1 to 2-12 that form the antenna groups 1 to 3.

Figure 12:
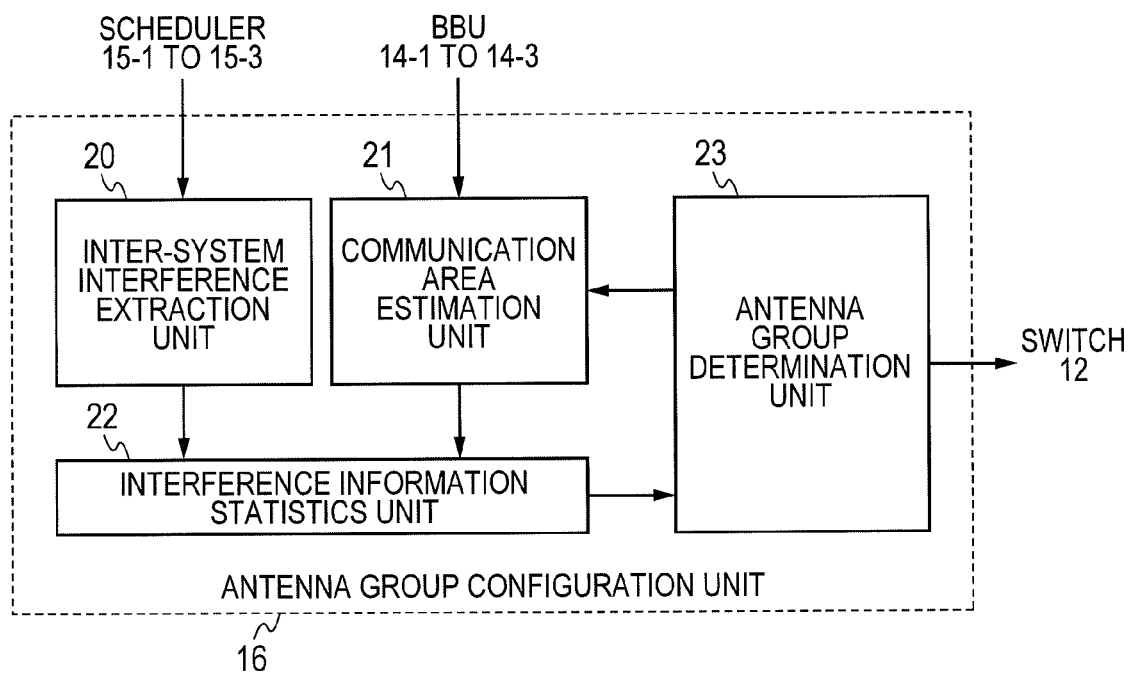
FIG. 12 is a diagram showing an example of an apparatus configuration of an antenna group configuration unit 16.

FIG. 12 shows a configuration of the antenna group configuration unit 16. FIG. 13 is a diagram showing an example of a table showing a correspondence between the antenna group and the antennas.

An inter-system interference extraction unit 20 is a part for calculating the inter-system interference power that each mobile station receives. The inter-system interference extraction unit 20 acquires information of the received power of each antenna group in the distributed antenna system and the received power from the out-of-system base station that respective mobile stations report from the schedulers 15-1 to 15-3. In the LTE, the information of the received powers is a Measurement Report, and corresponds to the cell ID and the RSRP of each cell. The inter-system interference extraction unit 20 determines whether an ID of the base station (or cell) reported from the mobile station is used in the distributed antenna system, and discriminates whether the received power of the base station corresponds to an intra-system interference power, or whether it corresponds to the inter-system interference power. Then, it adds the received powers of the multiple out-of-system stations to calculate a total value of the inter-system interference powers that the mobile station receives. However, the inter-system interference powers to add differ depending on the formation method of the antenna group that will be described later. In the case of using the formation method of the antenna group shown in FIG. 14, the inter-system interference powers to add are limited to those of the out-of-system base station that applies the ABS. In the case of using the formation method of the antenna group shown in FIG. 18, the inter-system interference powers of the out-of-system base station that applies the ABS and the inter-system interference powers of the out-of-system base station that does not apply the ABS are distinguished and added, respectively. The inter-system interference extraction unit 20 notifies the calculated inter-system interference power and the ID of the mobile station to an interference information statistics unit 22.

A communication area estimation unit 21 is a part for inferring in which communication area of the antenna the mobile station is located. The communication area estimation unit 21 acquires a combination of the antennas that currently form each antenna group from an antenna group determination unit 23. This is acquired, for example as shown in FIG. 13, in a form of an antenna ID for each antenna port ID of each antenna group ID (i.e., IDs of the BBUs 14-1 to 14-3). FIG. 13 is an example of a case of antenna group formation of FIG. 3. Then, the communication area estimation unit 21 acquires the received powers of the uplink reference signals at the respective antenna ports 13-1 to 13-3 of the BBUs 14-1 to 14-3 from the BBUs 14-1 to 14-3. The communication area estimation unit 21 specifies to which antenna of the antennas 2-1 to 2-12 the received power notified from each of the BBUs 14-1 to 14-3 corresponds using a correspondence among the BBUs 14-1 to 14-3, the antenna ports 13-1 to 13-3, and the antennas 2-1 to 2-12 shown in FIG. 13. Then, the communication area estimation unit 21 calculates the antenna ID at which the received power of the uplink reference signal becomes a maximum (or more than or equal to the previously set threshold). The above operation corresponds to Step S3 of FIG. 8. The communication area estimation unit 21 assumes that the mobile station is located in the communication area of the antenna at which the received power of the uplink reference signal becomes the maximum (or more than or equal to the previously set threshold), and notifies a mobile station ID of the mobile station and the antenna ID of the antenna at which the received power becomes the maximum (or more than or equal to the previously set threshold) to the interference information statistics unit 22.

The interference information statistics unit 22 is a part for calculating a correlation of the communication area of each antenna and the inter-system interference. The interference information statistics unit 22 manages the tables showing calculated results of the inter-system interference powers to respective antennas shown in FIG. 9 and FIG. 10 (or FIG. 24 and FIG. 25). Moreover, as will be described later, it manages the tables for calculating the intra-system interference power as shown in FIG. 16 and FIG. 17 if needed. The interference information statistics unit 22 acquires the mobile station ID and the inter-system interference power of the mobile station from the inter-system interference extraction unit 20. Furthermore, the interference information statistics unit 22 acquires the mobile station ID and the antenna ID of the communication area where the mobile station is located from the communication area estimation unit 21. Then, the interference information statistics unit 22 stores a relationship between the antenna ID and the inter-system interference power of the mobile station that has the same mobile station ID in memory in the form as shown in FIG. 9 (or FIG. 24). The above operation corresponds to Step S7 of FIG. 8. The interference information statistics unit 22 acquires a relationship between the antenna ID and the inter-system interference power for the multiple mobile stations, and averages the inter-system interference powers of the mobile stations located in the communication area of the same antenna ID. The above operations correspond to Steps S8 and S9 of FIG. 8. The interference information statistics unit 22 stores a correlation of the antenna ID and the averaged inter-system interference power in memory, for example, in the form as shown in FIG. 10 (or FIG. 25).

The antenna group determination unit 23 is a part for deciding the antennas 2-1 to 2-12 that forms each of the antenna groups 1 to 3 based on a relationship between the antenna ID acquired from the interference information statistics unit 22 and the inter-system interference power. That is, the BBUs 14-1 to 14-3, the antenna ports 13-1 to 13-3, and the schedulers 15-1 to 15-3 are allocated to the respective antennas 2-1 to 2-12. This operation corresponds to Step S10 of FIG. 8. If one of the BBUs 14-1 to 14-3 corresponds to one cell ID, the operation corresponds to allocating the cell ID to each antenna. A specific method will be described later. The antenna group determination unit 23 stores correspondences between the decided antenna groups 1 to 3 and the antennas 2-1 to 2-12 in a form as shown in FIG. 13. Then, the antenna group determination unit 23 notifies the correspondences between the antenna groups 1 to 3 and the antennas 2-1 to 2-12 to the switch 12 and the communication area estimation unit 21.

4. Formation Method of Antenna Groups

Below, a first embodiment of a method of deciding the antennas that form each antenna group in the antenna group determination unit 23 will be explained. The first embodiment assumes, for example, an environment where the intra-system interference arising between the antennas in the distributed antenna system is low or an antenna having a high intra-system interference is just one adjacent antenna or so. This environment corresponds, for example, to an environment where a transmission loss of an electric wave is high, such as a wall between floors and a floor, and an environment where a tilt angle of an indoor antenna is high and the intra-system interference power to the communication area of a different antenna becomes low.

Figure 14:
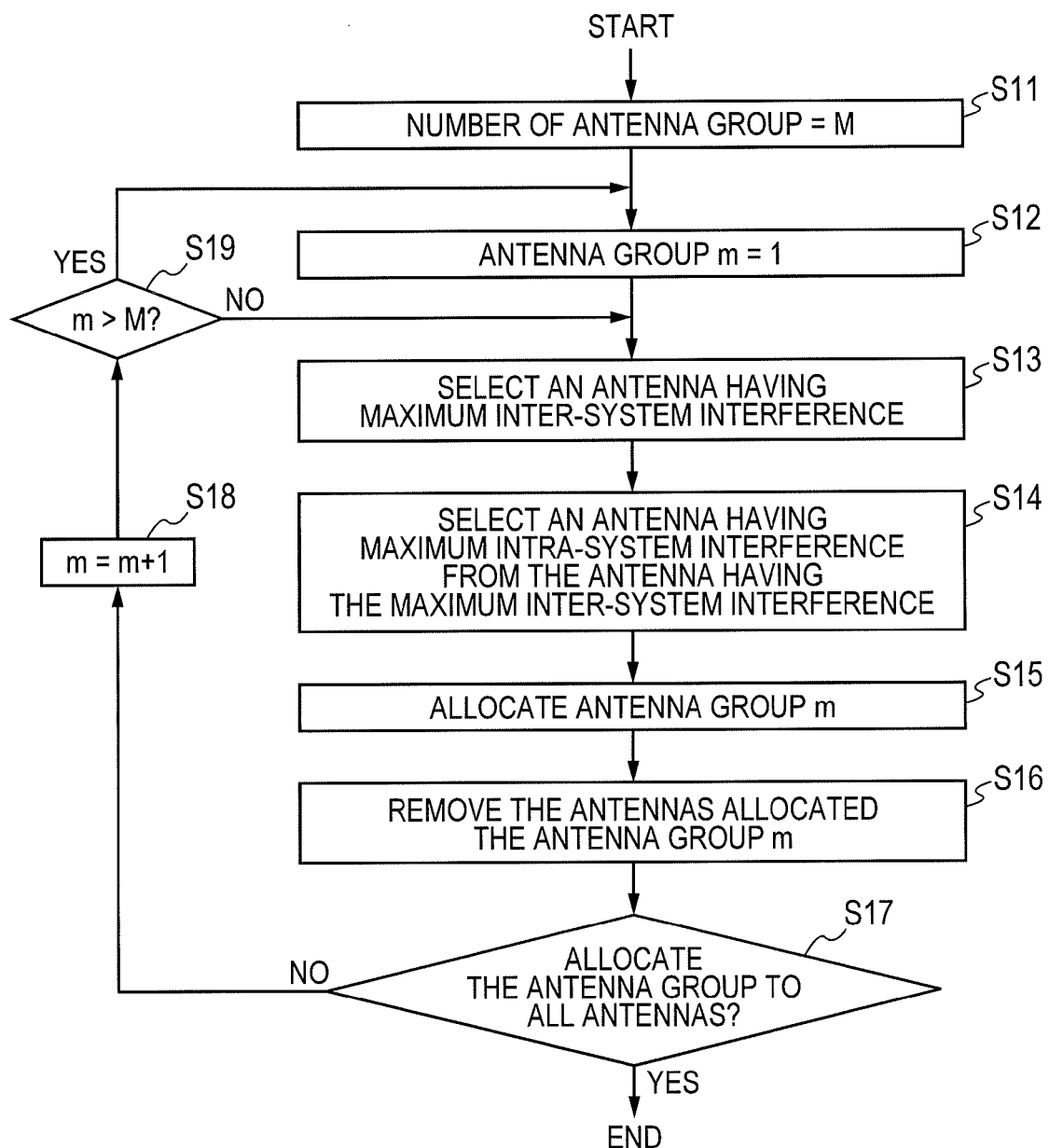
FIG. 14 is a flowchart of forming the antenna group according to the magnitudes of the inter-system interference power.

FIG. 14 shows a first example of a flowchart of deciding the antennas that form each antenna group in the antenna group determination unit 23. First, the antenna group determination unit 23 decides the number of antenna groups (M) to be formed (S11). The number of antenna groups M is the number of BBUs 14-1 to 14-3 that the base station 3 has, and is decided according to a traffic of the mobile station and a size of the communication area that the distributed antenna system covers. First, an antenna group number is set to m=1 (S12). However, in the case where one antenna group has one cell ID, m is the cell ID. For example, what is necessary is just to set it to the lowest number among cell IDs used within the distributed antenna system at Step S12. By the interference information statistics unit 22 referring to the table of FIG. 10 or doing other things, the antenna group determination unit 23 acquires the inter-system interference power to each antenna, and selects the antenna at which the inter-system interference power becomes a maximum (or more than or equal to a previously set threshold) (S13). Furthermore, it selects the antenna such that the intra-system interference caused by the antenna becomes a maximum (or more than or equal to a previously set threshold) (S14). The antenna at which the intra-system interference becomes a maximum (or more than or equal to the previously set threshold) may be calculated by a method that will be described later, or the intra-system interference may be stored in appropriate memory after being decided previously according to an installation position of the antenna etc., and be referred to. Then, the antenna group determination unit 23 allocates the same antenna group m to the two antennas selected at Steps S13 and S14 (S15). That is, the same BBU and scheduler are allocated. Subsequently, the antenna group determination unit 23 removes two allocated antennas from allocation objects of the antenna group (S16). If there remains an antenna to which no antenna group is allocated (S17), the process will proceed to the next antenna group (set m=m+1) (S18). If m becomes m>M, the process will return to Step S12 and repeats operations of Steps S13 to S16 after setting m to m=1 again. If it is not so, the process will return to Step S13 (S19). Then, it also performs operations of Step S13 to S16 on the next antenna group, similarly. The antenna group determination unit 23 repeats the operations until the antenna group is allocated to all the antennas. The correspondences of the antenna groups allocated to all the antennas are stored in memory of the antenna group determination unit 23 in the form shown in FIG. 13. What is necessary regarding the correspondence between the antenna port in the antenna group and the antenna is just to decide it by an arbitrary method, and, for example, the antenna port ID may be allocated to the antenna in an increasing order of the antenna ID.

FIG. 23 is a diagram showing an example of a table showing a correspondence between the antenna group and the antennas after a change.

By the use of the method shown in FIG. 14, the antenna that covers the communication area where the inter-system interference is high is allocated to a different antenna group. For example, if the method shown in FIG. 14 is applied, the antenna group formation of FIG. 13 will be altered to antenna group formation as shown in FIG. 23. Therefore, the mobile stations each of which has a high inter-system interference and has a high need to use the time resource of the ABS are decentralized to different antenna groups. As a result, the formation method of the antenna group according to this embodiment can increase the time resource of the ABS that the mobile station can use, and can improve the communication efficiency.

Hereafter, a second embodiment where the antenna group configuration unit 23 decides the antennas that form the antenna group will be described. The second embodiment assumes an environment where the intra-system interference, for example, arising between the antennas that are allocated to different antenna groups is high. In the second embodiment, the antenna group is formed based on magnitudes of both the inter-system interference power and the intra-system interference power. Therefore, it is necessary to calculate the intra-system interference power in addition to the inter-system interference power. First, a calculation method of the intra-system interference power will be described.

Figure 15:
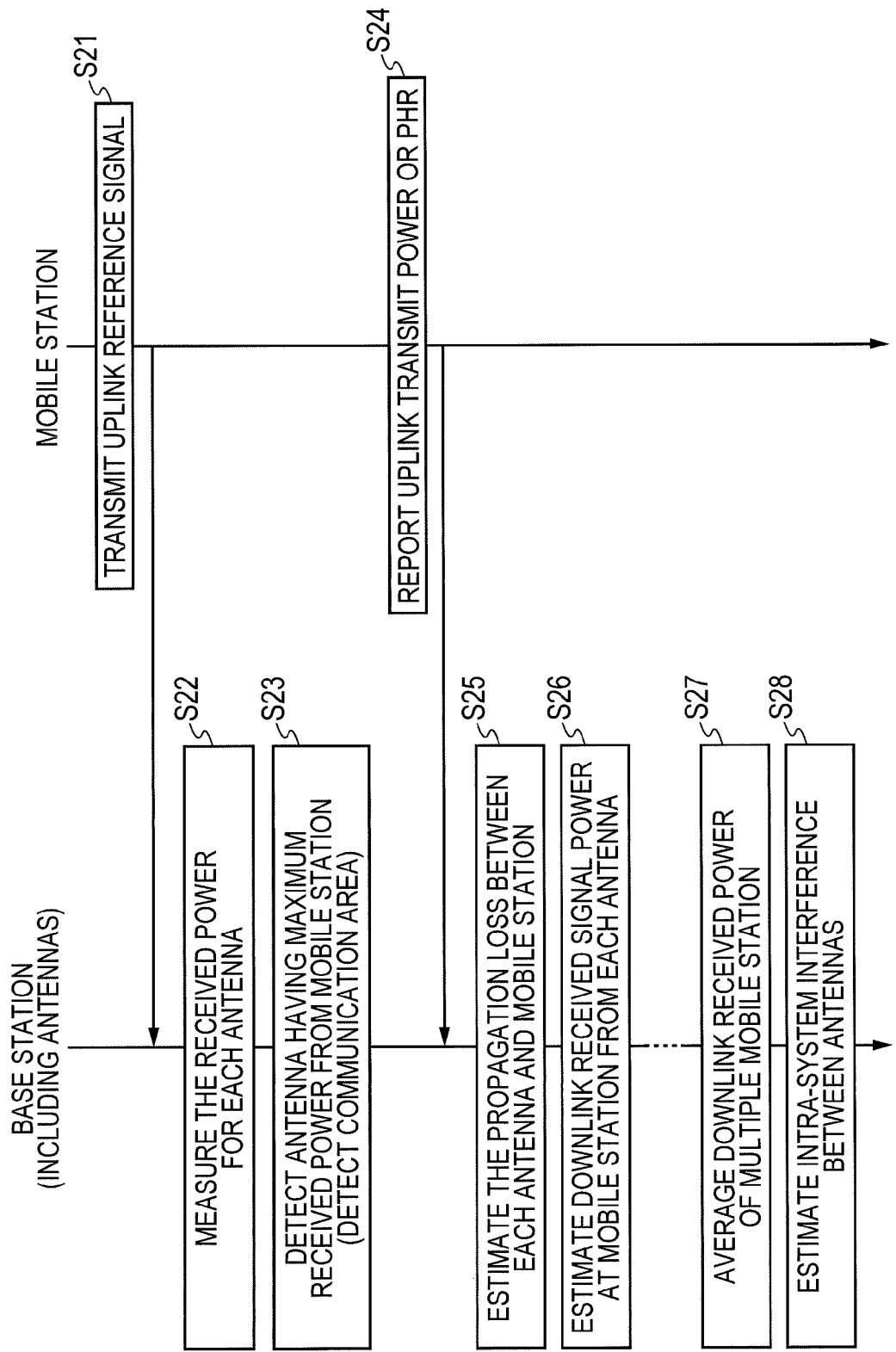
FIG. 15 is a sequence diagram until a relationship between the antenna and an intra-system interference power is calculated.

FIG. 15 is a sequence diagram until the intra-system interference power is calculated. FIG. 16 is a diagram showing an example of a table showing the antenna covering the communication area of each mobile station and a calculated result of the received power from each antenna in the communication area.

The base station shown in FIG. 15 includes the antennas. Calculation of the intra-system interference power is performed, for example, in the communication area estimation unit 21 in FIG. 12. The mobile station transmits the uplink reference signal to the base station (S21). The base station measures the received power of the uplink reference signal of each antenna received by the each antenna (S22). Then, it calculates the antenna whose uplink received power becomes a maximum (or more than or equal to the previously set threshold) (S23). Here, for a later explanation, the antenna whose uplink received power becomes a maximum (or more than or equal to the previously set threshold) is denoted as an antenna i. Moreover, although the explanation will be given assuming that values of the received power, the transmitted power, a propagation loss, Power Headroom Report (PHR), etc. are decibel values, they may be true values. Next, the mobile station reports the uplink transmitted power of the mobile station or PHR that is a difference between a maximum transmitted power and a current transmitted power of the mobile station (S24). When the PHR is reported at Step S24, the base station calculates the current transmitted power of the mobile station by subtracting the PHR from the maximum transmitted power of the mobile station. The maximum transmitted power of the mobile station is specified, for example, in Technical Specification (TS) 36.101 in the LTE and is a value called Configured maximum output power (Pcmax). Pcmax may be reported from the mobile station together with PHR, or the base station may calculate it according to a specification of TS36.101. Then, the base station estimates the propagation loss between the mobile station and each antenna by subtracting the transmitted power of the mobile station that was reported or calculated at S24 from the received power of the uplink reference signal of the each antenna that was measured at Step S22 (S25). Next, the base station calculates the received power of the signal transmitted from the each antenna at the mobile station by adding the propagation loss between the each antenna and the mobile station that was calculated at Step S25 to the transmitted power of the downlink of the each antenna (S26). By Steps S21 to S26, the received power to a certain specific mobile station located in the communication area of an antenna i from the each antenna can be calculated. The communication area estimation unit 21 notifies the received power of the mobile station located in the communication area of the antenna i from the each antenna calculated by operations of Steps S21 to S26 to the interference information statistics unit 22. The interference information statistics unit 22 stores the notified received power, for example, in memory in a form as shown in FIG. 16. For example, the first row of the table of FIG. 16 shows that the mobile station 5-1 is located in the communication area of the antenna 2-3, and an estimated value of the received power of the signal transmitted from the antennas 2-1 at the mobile station 5-1 is −75 (dBm). The second row and thereafter indicate the same. If each antenna is of the same antenna group as the antenna i, the received power will be a desired signal power; if it is of a different antenna group, the received power will be the intra-system interference power. The base station performs the operations of Steps S21 to S26 on the multiple mobile stations. The interference information statistics unit 22 averages the received powers of the mobile stations located in the communication area of the same antenna ID among the received powers of the multiple mobile stations of FIG. 16, respectively (S27). As a result, the base station can infer the desired signal power from each antenna for the communication area of the antenna i, or the intra-system interference power (S28). For example, in FIG. 16, the received powers from the transmit antennas ID2-1, 2-2, . . . of the mobile station 5-1 and the mobile station 5-2 both located in the communication area of the antenna ID2-3 are averaged, respectively. As a result, the base station can calculate the average of the received powers from the antennas in the communication area of the antenna 2-3. This situation is the same also for the mobile station located in the communication area of an other antennas.

The intra-system interference power calculated by the above operation is stored in the interference information statistics unit 22 in a form as shown in FIG. 17. An element of the i-th row and the j-th column of FIG. 17 shows the average value (dBm) of the received powers of the signal transmitted from an antenna j in the communication area of the antenna i. Diagonal elements always show the desired signal powers. If the antenna i and the antenna j are of the same antenna group, a non-diagonal element shows the desired signal power; if they are of different antenna groups, the non-diagonal element shows the intra-system interference power. Incidentally, in FIG. 17, although all the diagonal elements are set to −50 dBm, they may differ according to a position of the antenna or an environment of a building.

Figure 18:
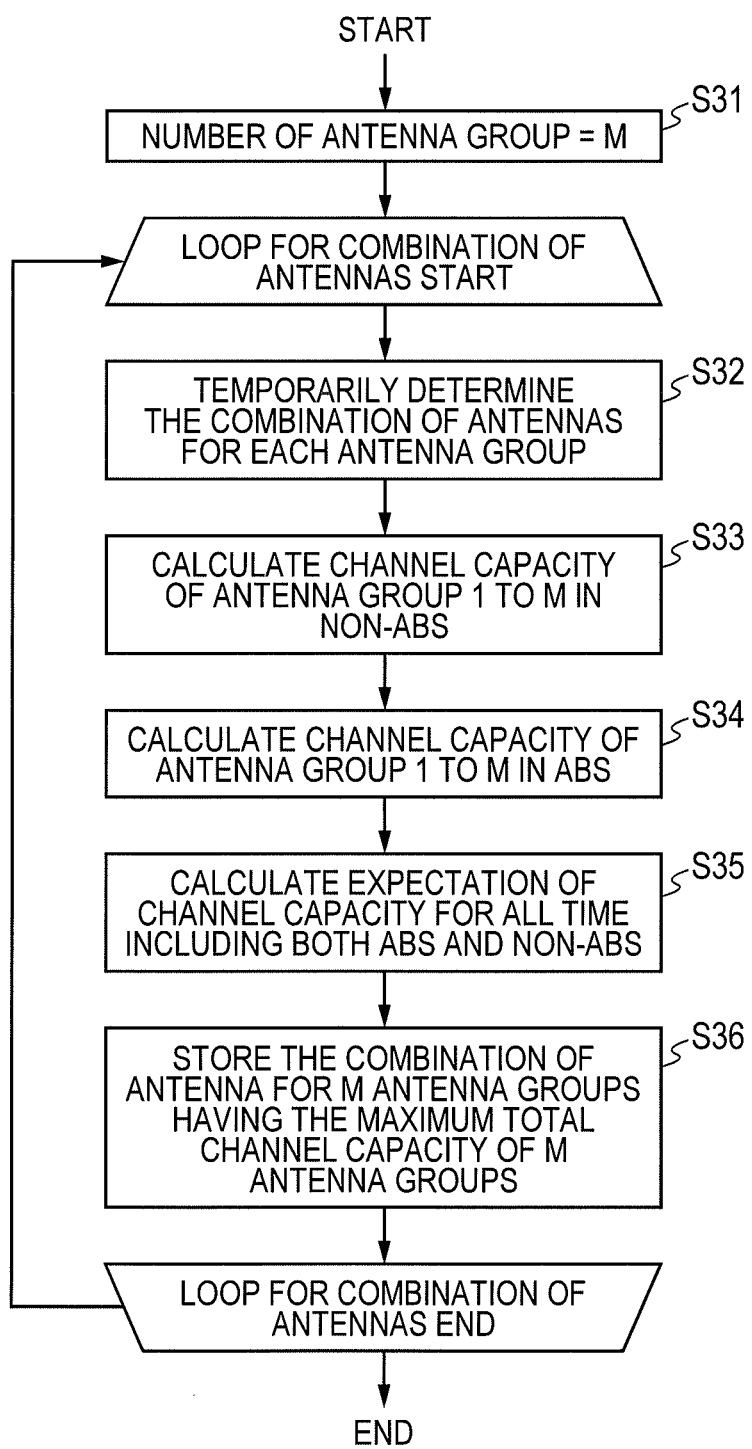
FIG. 18 is a flowchart of forming the antenna group in consideration of both the intra-system interference power and the inter-system interference power.

FIG. 18 shows a second example of the flowchart that decides the antennas that form the antenna group in the antenna group determination unit 23. Below, the ABS will be mainly explained, but the situation is the same in the case of the FFR.

The antenna group determination unit 23 decides the antenna groups as follows with reference to the intra-system interference power of FIG. 17 and the inter-system interference power of FIG. 25 stored in the interference information statistics unit 22. First, the antenna group determination unit 23 sets the number of the antenna groups to be formed, similarly with the case of FIG. 14, to M (S31). Subsequently, the antenna group determination unit 23 makes a tentative decision of one certain combination of the antennas that form the antenna groups 1 to M (S32). Then, the antenna group configuration unit 23 calculates channel capacities of the antenna groups 1 to M that are tentatively decided in a time other than the ABS (or in a frequency other than the FFR) (S33). A channel capacity $C_{nonABS,m}$ in a time other than the ABS of the antenna group m is expressed by Formula (1).

[Formula 1]

$$C_{nonABS,m} = \sum_{i \in A_m} \log_2 \left( 1 + \frac{\sum_{j \in A_m} S_{i-j}}{N + I_i^{out,nonABS} + \sum_{j \notin A_m} I_{i-j}^{in}} \right) \quad (1)$$

However, $A_m$ is a set of the antennas that are tentatively decided to be in the antenna group m, and $S_{i-j}$ is the desired signal power from the antenna j in the communication area of the antenna i, which corresponds to an i-th row and j-th column element of FIG. 17 (however, being converted into a true value). That is, a numerator of a second term in log is a sum of the received powers from all the antennas that are tentatively decided to be in the antenna group m. N is a noise power and $I^{out,nonABS}_i$ is the inter-system interference power in the communication area of the antenna i, which corresponds to a sum of the i-th row elements of the inter-system interference power from the out-of-system base stations applying the ABS and the inter-system interference power from the out-of-system base stations not applying the ABS in FIG. 25 (however, it is a sum of those converted into true values). $I^{in}_{i-j}$ the intra-system interference power from the antenna j in the communication area of the antenna i, and corresponds to the i-th row and j-th column element of FIG. 17 (true value). That is a third term in a denominator of the second term in the log is a sum of the received powers from all the antennas within the distributed antenna system other than the antennas that are tentatively decided to be in the antenna group m. Formula (1) expresses a sum of the channel capacities of the communication area of the antennas that form the antenna group m in a time other than the ABS.

Similarly, the antenna group determination unit 23 calculates the channel capacities of the antenna groups 1 to M that are tentatively decided in the ABS (or the frequency to which the FFR is applied) (S34). The channel capacity $C_{ABS,m}$ of the antenna group m in the ABS can be expressed by Formula (2).

[Formula 2]

$$C_{ABS,m} = \sum_{i \in A_m} \log \left( 1 + \frac{\sum_{j \in A_m} S_{i-j}}{N + I_i^{out,ABS} + \sum_{j \notin A_m} I_{i-j}^{in}} \right) \quad (2)$$

However, $I^{out,ABS}_i$ is the inter-system interference power of the communication area of the antenna i in the ABS. In the ABS, the inter-system interference power of the out-of-system base station to which the ABS is applied becomes almost zero. Therefore, the inter-system interference power $I^{out,ABS}_i$ in the ABS corresponds to the inter-system interference power from the out-of-system base stations not applying the ABS of the i-th row of FIG. 25.

Next, the antenna group determination unit 23 calculates an expected value of the channel capacities of each of the antenna groups 1 to M in full time (in the case of the FFR, in full frequencies) (S35). The expected value $C_m$ of the channel capacity of the antenna group m in full time can be expressed by Formula (3).

[Formula 3]

$$C_m(1-T_{ABS})C_{nonABS,m}+T_{ABS}C_{ABS,m} \quad (3)$$

However, $T_{ABS}$ is a ratio of a time when the out-of-system base station becomes in the ABS to full communication time. For example, as shown in FIG. 5, when the Subframes 1, 3, 6, and 8 becomes to be in the ABS, $T_{ABS}$ becomes $T_{ABS}=0.4$ Next, the antenna group determination unit 23 stores a combination of the antenna group in which a sum of the channel capacities of M antenna groups 1 to M becomes a maximum (or more than or equal to a previously set threshold) and the antennas (S36). A sum C of the channel capacities of M antenna groups 1 to M can be expressed by Formula (4).

[Formula 4]

$$C = \sum_{m=1}^{M} C_m \quad (4)$$

The antenna group determination unit 23 performs operations of Steps S32 to S36 on all the combinations of the antenna group and the antennas, and calculates a combination of antennas in which a sum of the channel capacities of M antenna groups becomes a maximum (or more than or equal to the previously set threshold). However, Step S36 may change the combination of the antenna group and the antennas to be stored according to a requirement of the system. For example, a combination in which a minimum of the channel capacities of M antenna groups obtained from Formula (3) becomes a maximum (or more than or equal to a previously set threshold) may be stored. Similarly with the case of FIG. 14, the calculated correspondence between the antenna group and the antennas is stored in the memory of the antenna group determination unit 23 in the form as shown in FIG. 13. By using the method of FIG. 18, the antenna group based on both the inter-system interference and the intra-system interference can be formed.

5. Scheduling Method in Antenna Group

Figure 19:
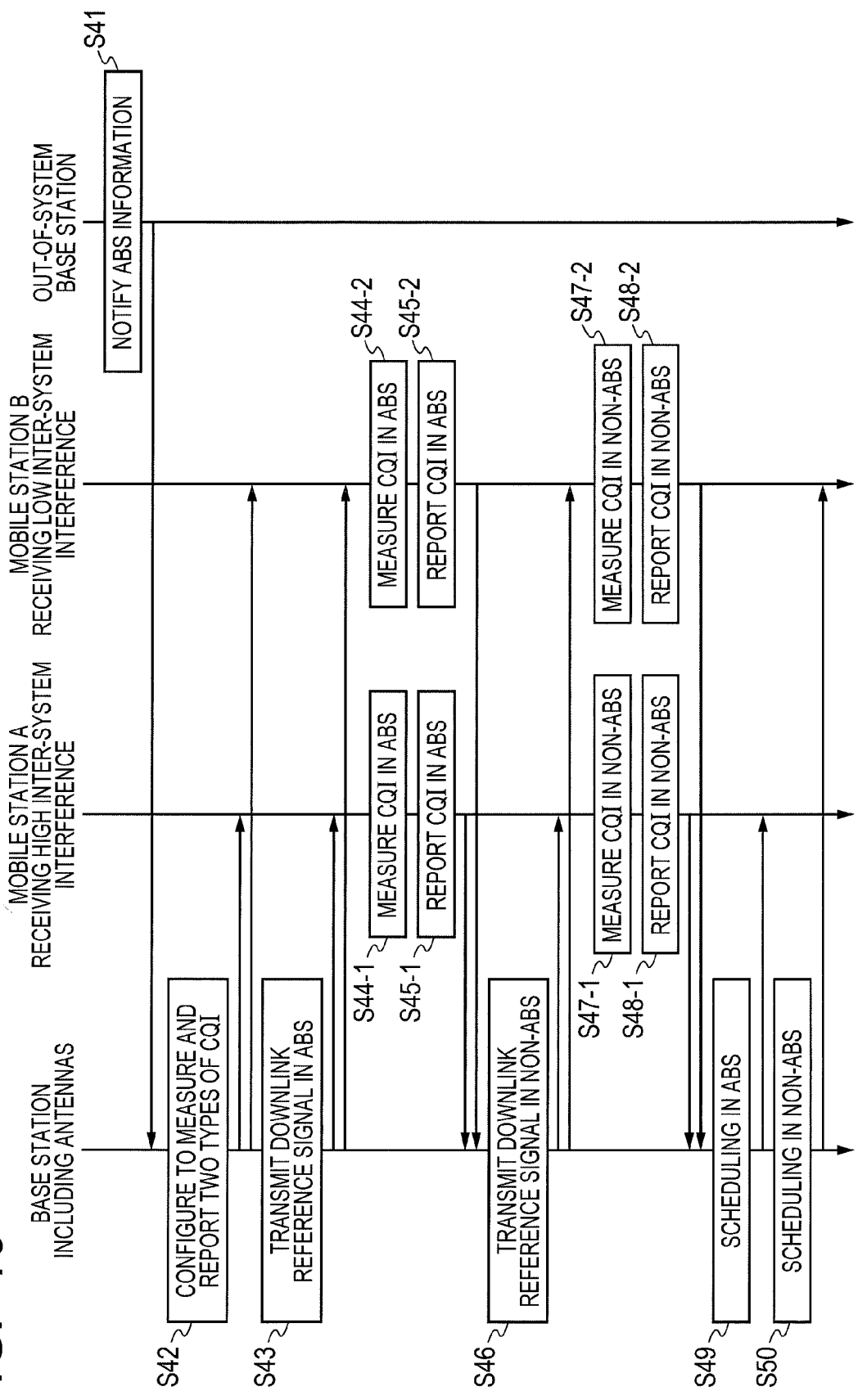
FIG. 19 is a sequence diagram until scheduling in the antenna group is performed when using the ABS.

Below, a scheduling method of the schedulers 15-1 to 15-3 in each antenna group of the distributed antenna system when the out-of-system base station uses the ABS will be explained. The scheduling method is not dependent on a combination of the antennas that form the antenna group. That is, the same method can be used even if whatever kind of antenna group is formed. FIG. 19 shows a procedure of scheduling in the case where a mobile station with a high inter-system interference and one with a low inter-system interference are connected to the same antenna group. In FIG. 19, the mobile station with a high inter-system interference is denoted as a mobile station A and the mobile station with a low inter-system interference is denoted as a mobile station B. The base station of the distributed antenna system acquires information on a time when the out-of-system base station begins to be in the ABS from the out-of-system base station (S41). The base station sets the mobile stations A and B so that they may measure and report two kinds of CQIs based on the information of the ABS (S42). One of them is CQI measured only in the ABS of the out-of-system base station, and the other is CQI measured only in a time other than the ABS. For example, what the base station should do is just to specify a Subframe number in which each CQI is measured by a bit map format to the mobile station. The two kinds of CQIs are different in a time at which the mobile station reports, or in a frequency resource used for the report, or the like. The mobile stations A and B receive the downlink reference signal (S43) transmitted from the base station in the ABS (of the out-of-system base station), and measure the CQIs in the ABS, respectively (S44-1, S44-2). Then, the mobile stations A and B report the CQIs in the ABS to the base station (S45-1, S45-2). Similarly, the mobile stations A and B receive the downlink reference signal (S46) transmitted from the base station in a time other than the ABS, and measure CQIs in a time other than the ABS, respectively (S47-1, S47-2). Then, the mobile stations A and B report the CQIs in a time other than the ABS to the base station, respectively (S48-1, S48-2). The base station allocates the time resources to the mobile stations based on the reported CQIs of the mobile stations A and B both in the ABS and in a time other than the ABS (i.e. scheduling is done). There is a possibility that the mobile station A with a high inter-system interference suffers considerable fall in CQI in a time other than the ABS. Therefore, the base station allocates the time resource of the ABS preferentially to the mobile station A (S49). On the other hand, in the mobile station B with a low inter-system interference, the fall of the CQI is low compared with the mobile station A also in a time other than the ABS. Therefore, the base station allocates the time resource other than of the ABS preferentially to the mobile station B (S50).

Figure 20:
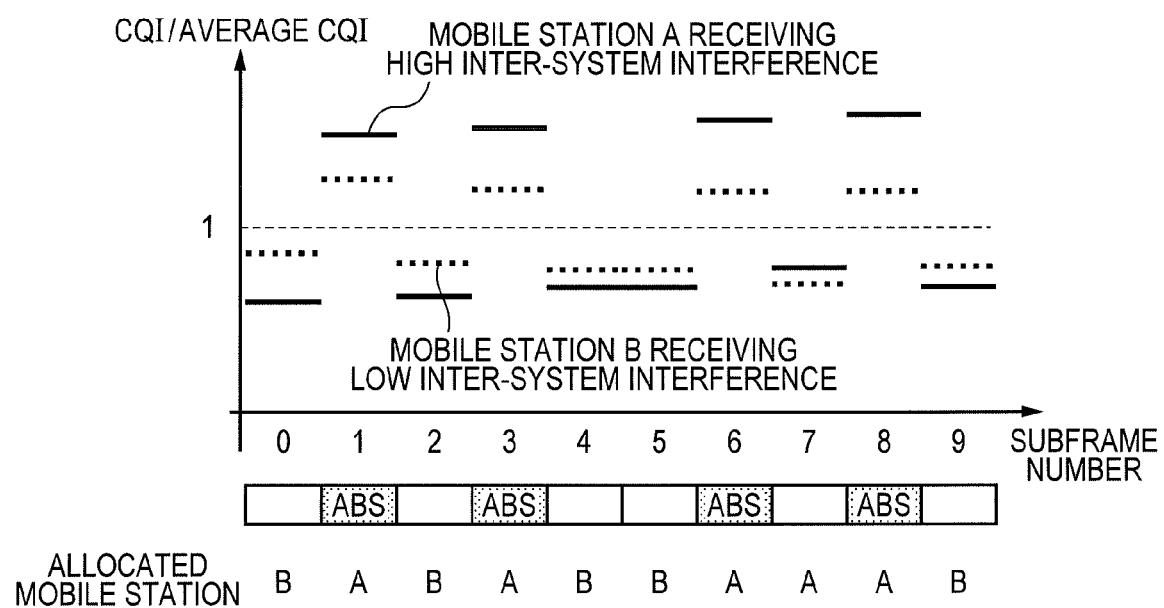
FIG. 20 is a diagram showing an example of CQIs in the ABS and in a time other than the ABS of a mobile station with a high inter-system interference and a mobile station with a low inter-system interference, and an allocation result of the time resource.

FIG. 20 shows variations of the CQIs normalized by the average CQI in each Subframe of the mobile stations A and B, and the mobile stations that are allocated the time resources. The average CQI is an average value of the CQIs in both the ABS and a time other than the ABS. In FIG. 20, it is assumed that the Subframes 1, 3, 6, and 8 are in the ABS of the out-of-system base station. In the ABS, since the inter-system interference is reduced, the CQI of the mobile station A with a high inter-system interference improves considerably. On the other hand, in a time other than the ABS, the CQI of the mobile station A falls. That is, the mobile station A has a high difference of CQI between in the ABS and in a time other than the ABS. Also in the mobile station B having a low inter-system interference, the CQI improves in the mobile station B like the mobile station A. However, an influence that the inter-system interference exerts on the CQI of the mobile station B is low compared with that of the mobile station A. Therefore, compared with the mobile station A, the difference of CQI between in the ABS and in a time other than the ABS becomes low.

For example, each of the schedulers 15-1 to 15-3 uses a scheduling method specified by Proportional Fairness. In the Proportional Fairness, each of the schedulers 15-1 to 15-3 uses a value of the CQI normalized by the average CQI as the evaluation function, and allocates the time resource to the mobile station at which the evaluation function becomes a maximum (or more than or equal to a previously set threshold). As a result, as shown in FIG. 20, it is possible to allocate the time resource of the ABS preferentially to the mobile station A with a high inter-system interference, and to allocate the time resource other than of the ABS preferentially to the mobile station B with a low inter-system interference. However, like the Subframe 7 of FIG. 20, when the evaluation function of the mobile station A becomes high compared with that of the mobile station B even in a time other than the ABS, the schedulers 15-1 to 15-3 allocate the time resource to the mobile station A. On the contrary, when the evaluation function of the mobile station B in the ABS is high compared with the evaluation function of the mobile station A, they allocate the time resource of the ABS to the mobile station B. That is, the schedulers 15-1 to 15-3 do not need to distinguish completely the mobile station to which only the time resource of the ABS is allocated and the mobile station to which only the time resource other than of the ABS is allocated, and should just allocate the time resource according to a value of the evaluation function. The above operations are the same even when mobile stations other than the mobile stations A and B exist.

Figure 21:
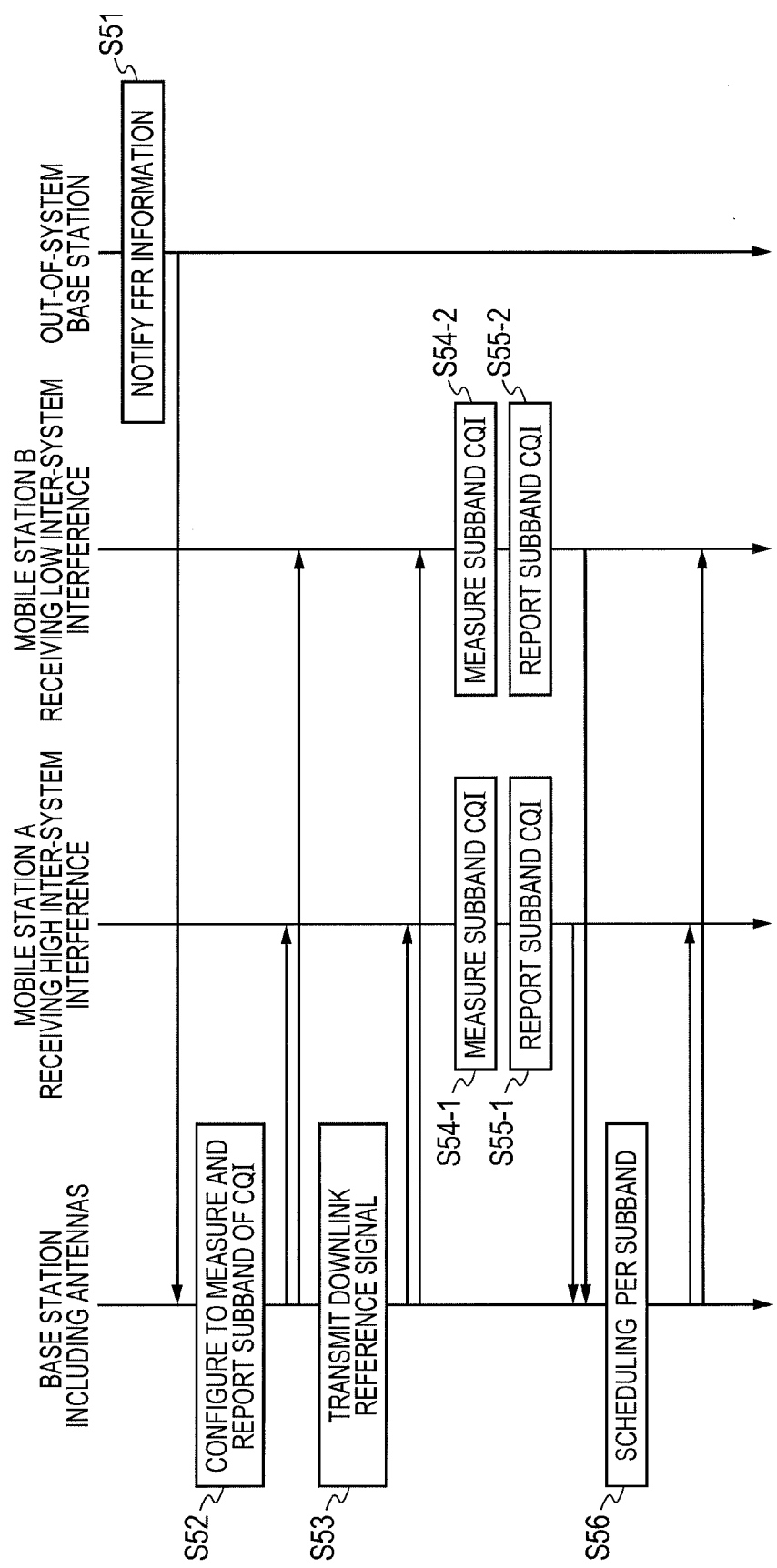
FIG. 21 is a sequence diagram until scheduling in the antenna group is performed when FFR is used.

FIG. 21 is a sequence diagram showing a procedure of scheduling when the out-of-system base station uses the interference reduction technology by the FFR. What is different from the above-mentioned ABS is that while the ABS produces a time (Subframe) at which the inter-system interference power is low, the FFR produces a frequency (or Resource Block) at which the inter-system interference power is low, and fundamental operations of the both are the same.

In FIG. 21, like in FIG. 19, the mobile station with a high inter-system interference is denoted as a mobile station A and the mobile station with a low inter-system interference is denoted as a mobile station B. The base station of the distributed antenna system acquires FFR information of the out-of-system base station from the out-of-system base station (S51). More specifically, it acquires information of RNTP indication indicating whether the transmitted power exceeds a certain threshold for each Resource Block. Subsequently, the base station sets the mobile stations A and B so that they may measure and report the CQI for each Subband, respectively (S52). The Subband is a unit that put together multiple Resource Blocks. However, it is not necessary to limit the unit of the CQI in the frequency direction to be measured and reported to the Subband, and it may be done for each Resource Block. The mobile stations A and B receive the reference signal (S53) transmitted from the base station, and measure the CQIs in the respective Subbands (S54-1, S54-2). Then, the mobile stations A and B report the CQIs of the respective Subbands to the base station (S55-1, S55-2). The base station allocates a frequency resource to the mobile station based on the reported CQIs of the mobile stations A and B (i.e. scheduling is done). In FIG. 21, although it is assumed that the scheduling shall be performed for each Subband, it may be done for each Resource Block, or the frequency resource may be allocated using another arbitrary frequency as a unit.

Figure 22:
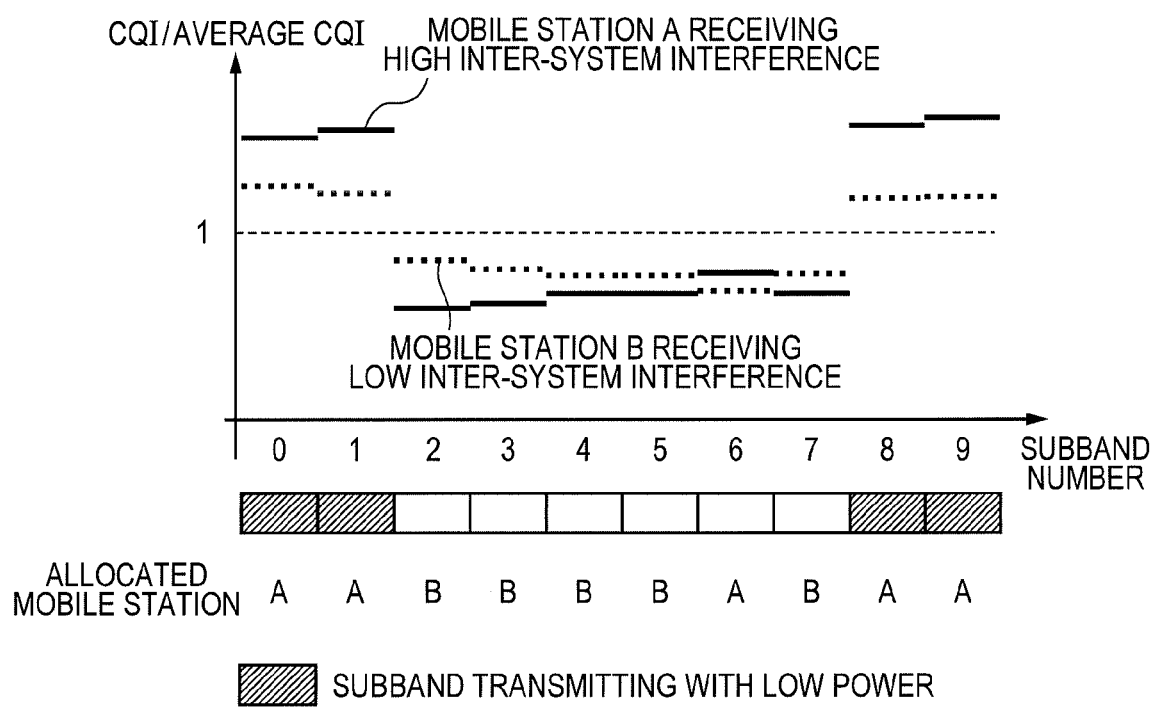
FIG. 22 is a diagram showing an example of CQIs of each Subband of the mobile station with a high inter-system interference and the mobile station with a low inter-system interference, and an allocation result of the Subband.

FIG. 22 shows variations of the CQIs normalized by the average CQI in the respective Subbands of the mobile stations A and B, and mobile stations to which the respective Subbands are allocated when the out-of-system base station is performing interference reduction by the FFR. FIG. 22 shows a scheduling result in one certain Subframe. The average CQI is an average value of the CQIs of all the past Subframes and Subbands. In FIG. 22, it is assumed that there are total 10 Subbands, Subbands zero to nine. In FIG. 22, it is assumed that the inter-system base station designates Subbands 0, 1, 8, and 9 as Subbands to which the FFR is applied and the transmitted powers of these Subbands are made low compared to those of Subbands 2 to 7. For example, each of the schedulers 15-1 to 15-3 uses a scheduling method specified by Proportional Fairness for each Subband. That is, the Subband is allocated to the mobile station at which the evaluation function becomes a maximum (or more than or equal to the previously set threshold) using a value of the CQI of each Subband normalized with the average CQI as the evaluation function. Similarly with the case of the ABS of FIG. 20, since the inter-system interference is reduced in the Subband in which the out-of-system base station decreases the transmitted power, the CQI of the mobile station A with a high inter-system interference improves considerably. As a result, as shown in FIG. 22, the schedulers 15-1 to 15-3 can allocate the Subband in which the inter-system interference power is low to the mobile station A preferentially, and can allocate the Subband other than that to the mobile station B preferentially.

In FIG. 20, although it is assumed that full frequency resources shall be allocated to one mobile station in one Subframe for an explanation, the mobile station to which the frequency resource is allocated may be decided for each Subband as shown in FIG. 22.

What is claimed is:
1. A distributed antenna system, comprising:
a plurality of antennas; and
a base station for transmitting or receiving a signal by the antennas,
forming a plurality of antenna groups, and deciding a single antenna or antennas that form the each antenna group;
wherein when an other base station other than the base station included in the distributed antenna system provides a time or frequency at which a transmitted power is reduced or zero among of time or frequency resources, the base station
estimates the antennas in a communication area of each mobile station using received powers of an uplink reference signal transmitted by each mobile station,
calculates interference powers from the other base station to the mobile stations in the communication area of the antennas based on received powers of a downlink reference signal transmitted from the other base station that respective mobile stations report,
calculates a first interference power from the other base station to the communication area of respective antennas by averaging the interference powers from the other base station that the mobile stations report,
decentralizes a single or a plurality of antennas at which the first interference power is relatively high into different antenna groups according to magnitudes of the calculated first interference power, and
decides the antennas that form the antenna group by combining the antenna(s) with a single antenna or antennas at which the first interference power is relatively low.
2. The distributed antenna system according to claim 1, wherein the base station
acquires the first interference power for each antenna,
selects a first antenna with which the first interference power becomes a maximum or more than or equal to a previously set threshold,
selects a second antenna with which a second interference power arising between the antennas connected to the base station becomes a maximum or more than or equal to a previously set threshold,
allocates the same antenna group to the selected first and second antennas, and
decides the antenna group for a plurality of antennas in the system by repeating the selection of the first antenna, the selection of the second antenna, and the allocation of the antenna group and for each antenna.

3. The distributed antenna system according to claim 2, wherein the base station
measures a received power of the uplink reference signal for each antenna received by the each antenna,
receives a report of the uplink transmitted power of the mobile station or a difference between a maximum transmitted power of the mobile station and a current transmitted power from the each mobile station,
calculates the downlink received power at the each mobile station from the received power of the uplink reference signal of the each antenna that was measured and the reported or calculated transmitted power of the each mobile station,
finds an average value of the received powers of the signals transmitted from a plurality of other antennas in the communication area of the each antenna, and
finds the second interference power among the each antenna and the other antennas.

4. The distributed antenna system according to claim 2, wherein the second interference power from a plurality of other antennas is previously stored for each antenna.

5. The distributed antenna system according to claim 1, wherein the base station
calculates a second interference power arising among the antennas connected to the base station by averaging the received powers of the downlink reference signal calculated from the received powers of the uplink reference signals that the mobile stations transmit, and
forms the antenna group so that a sum of channel capacities of the antenna group that are obtained based on the second interference power, the first interference power, and a ratio of a time or frequency at which the first interference power becomes low may become a maximum or more than or equal to a previously set threshold.

6. The distributed antenna system according to claim 5, wherein the base station
measures the received power of the uplink reference signal received by each antenna for each antenna,
receives a report of the uplink transmitted power of the mobile station or a difference between a maximum transmitted power and a current transmitted power of the mobile station,
calculates the downlink received power at each mobile station from a received power of the uplink reference signal being measured and the transmitted power of the each mobile station that was reported or calculated,
finds an average value of the received powers of the signals transmitted from a plurality of other antennas in the communication area of the each antenna, and
finds the second interference power among the each antenna and the other antennas.

7. The distributed antenna system according to claim 5, wherein the second interference power from a plurality of other antennas is previously stored for each antenna.

8. The distributed antenna system according to claim 1, wherein the base station
calculates a first channel capacity at a time other than Almost Blanc Subframe or a frequency other than Fractional Frequency Reuse of each antenna group that is tentatively decided,
calculates a second channel capacity at a time of the Almost Blanc Subframe or frequency of the Fractional Frequency Reuse of each antenna group that is tentatively decided,
calculates a sum of the channel capacities of each antenna group in full time in the case of the Almost Blanc Subframe or in full frequencies in the case of the Fractional Frequency Reuse based on the first and second channel capacities, and
decides the antenna group for a plurality of antennas in the system by calculating a combination of the antennas in which the sum of the channel capacities becomes a maximum or more than or equal to a previously set threshold for possible combinations of the antenna group and the antennas.

9. The distributed antenna system according to claim 1, wherein the base station
allocates a time resource of Almost Blanc Subframe or a frequency resource of Fractional Frequency Reuse preferentially to a mobile station located in the communication area where the first interference is high, and allocates a time resource other than of the Almost Blanc Subframe or a frequency resource other than of the Fractional Frequency Reuse preferentially to a mobile station located in the communication area where the first interference is low.

10. The distributed antenna system according to claim 1, wherein the base station
acquires Almost Blanc Subframe information from the other base station,
receives a report of a communication quality in Almost Blanc Subframe and a communication quality in a time other than the Almost Blanc Subframe, and
allocates a time resource of the Almost Blanc Subframe preferentially to a mobile station at which the first interference is high, while allocates a time resource other than of the Almost Blanc Subframe to a mobile station at which the first interference is low.

11. The distributed antenna system according to claim 1, wherein the base station
acquires Fractional Frequency Reuse information from the other base station,
receives a report of communication qualities of the Subbands from each mobile station,
allocates a Subband in which the first interference power is low preferentially to a mobile station at which the first interference is high, and
allocates a Subband other than that Subband preferentially to a mobile station at which the first interference is low.

12. The distributed antenna system according to claim 1, wherein one antenna group has one cell ID.

13. The distributed antenna system according to claim 1, wherein the base station comprises:
a baseband unit for performing a baseband signal processing of the antenna group that includes a single or a plurality of antennas;
a plurality of schedulers for allocating the time or frequency resources to the mobile stations in the antenna group;
an antenna group configuration unit that forms a plurality of antenna groups and decides a single or a plurality of antennas that form the each antenna group; and
a switch for connecting between the baseband unit and the single antenna or the antennas according to the decided antenna group.

14. A distributed antenna allocation method in a distributed antenna system,
wherein the distributed antenna system comprises
a plurality of antennas, and
a base station for transmitting or receiving a signal from the antennas, forming a plurality of antenna groups, and deciding a single antenna or antennas that form each antenna group, wherein when an other base station other than the base station included in the distributed antenna system provides a time or frequency at which a transmitted power is reduced or zero among of time or frequency resources, the base station estimates the antennas in the communication area of each mobile station using received powers of an uplink reference signal transmitted by each mobile station, calculates interference powers from the other base station to the mobile stations in the communication area of the antennas based on the received powers of a downlink reference signal of the other base station that respective mobile stations report, calculates a first interference power from the other base station to the communication area of the antennas by averaging the interference powers from the other base station that the mobile stations report, decentralizes a single or a plurality of antennas at which the first interference power is relatively high into different antenna groups according to magnitudes of the calculated first interference power, and decides the antennas that form the antenna group by combining the antenna(s) with a single antenna or antennas at which the first interference power is relatively low.

15. A base station in a distributed antenna system, comprising an antenna group configuration unit for transmitting or receiving signals from a plurality of antennas, forming a plurality of antenna groups, and deciding a single antenna or antennas that form the each antenna group, wherein when an other base station other than the base station included in the distributed antenna system provides a time or frequency at which a transmitted power is reduced or zero among of time or frequency resources, the antenna group configuration unit estimates antennas in the communication area of each mobile station using received powers of an uplink reference signal transmitted by each mobile station, calculates interference powers from the other base station to the mobile stations in the communication area of the antennas based on received powers of a downlink reference signal from the other base station that respective mobile stations report, calculates a first interference power from the other base station to the communication area of the respective antennas by averaging the interference powers from the other base station that the mobile stations report, decentralizes a single antenna or antennas at which the first interference power is relatively high into different antenna groups according to magnitudes of the calculated first interference power, and decides the antennas that form the antenna group by combining the antenna(s) with a single antenna or antennas among the antennas at which the first interference powers are lower than the first interference power of the decentralized antennas.

* * * * *